(12) United States Patent
Sakamoto et al.

(10) Patent No.: US 6,807,427 B1
(45) Date of Patent: Oct. 19, 2004

(54) RADIO TERMINAL AND INFORMATION RECEPTION CONTROL METHOD SUITABLE FOR PUSH TYPE INFORMATION DISTRIBUTION SYSTEM

(75) Inventors: Takafumi Sakamoto, Kanagawa (JP); Eiji Kamagata, Kanagawa (JP); Keiji Tsunoda, Kanagawa (JP); Kiyoshi Toshimitsu, Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 582 days.

(21) Appl. No.: 09/723,226

(22) Filed: Nov. 28, 2000

(30) Foreign Application Priority Data

Dec. 10, 1999 (JP) .......................................... P 11-351903

(51) Int. Cl.[7] .................................................. H04Q 7/20
(52) U.S. Cl. ................................ 455/456.1; 455/456.3; 455/456.6; 455/414.2; 455/414.3; 455/404.2
(58) Field of Search ........................... 455/456.1, 456.3, 455/456.6, 67.11, 414.2, 414.3, 404

(56) References Cited

U.S. PATENT DOCUMENTS 6,133,871 A * 10/2000 Krasner ................... 455/343.1
6,216,015 B1 * 4/2001 Hymel ....................... 455/558
6,256,498 B1 * 7/2001 Ludwig ...................... 455/433
6,353,398 B1 * 3/2002 Amin et al. .............. 455/456.6

FOREIGN PATENT DOCUMENTS

JP        11-068965      *  3/1999

* cited by examiner

*Primary Examiner*—David Hudspeth
*Assistant Examiner*—Huy D Nguyen
(74) *Attorney, Agent, or Firm*—Oblon, Spivak, McClelland, Maier & Neustadt, P.C.

(57) ABSTRACT

A radio terminal capable of effectively utilizing push type distribution information is disclosed. The radio terminal is formed by a reception unit configured to receive push type distribution information from a radio base station, a location recognition unit configured to carry out a recognition related to an area in which the radio terminal is located, and a reception control unit configured to determine whether or not to receive the push type distribution information according to a recognition result of the location recognition unit, and control the reception unit according to a determination result.

1 Claim, 25 Drawing Sheets

RADIO TERMINAL AND INFORMATION RECEPTION CONTROL METHOD SUITABLE FOR PUSH TYPE INFORMATION DISTRIBUTION SYSTEM

BACKGROUND OF THE INVENTION

1. Field of the Invention

The present invention relates to a radio terminal and an information reception control method in a radio communication system in which radio base stations for transmitting push type distribution information are arranged at spots.

2. Description of the Background Art

The standardization of the MMAC (Multimedia Mobile Access Communication) system as a radio communication system for providing multimedia information to a user quickly by using radio is currently in progress, and various applications utilizing a radio communication system capable of fast transmission such as this MMAC system are currently developed. For example, it is possible to consider a system in which a radio base station broadcasts information that should be notified to many users such as advertisement or emergency information, such that all radio terminals that can communicate with the radio station can receive the information.

In such a radio communication system, a radio terminal receives the information broadcasted by the radio base station. The radio terminal received the broadcasted information whenever it becomes capable of communicating with the radio base station that is broadcasting the information. Consequently, it becomes possible to receive the information from the radio base station without requiring a user to carry out an operation to receive the information. On the other hand, however, the information broadcasted by the radio base station will be received even at a location where the reception of the information is not desired by the user. As a result, there arises a problem that the radio terminal will wastefully consume its battery power and memory capacity.

An example of the conventional radio terminal will now be described with reference to FIG. 26 and FIG. 27. FIG. 26 shows an exemplary configuration of the conventional radio terminal, which is a radio terminal capable of receiving push type distribution information. Also, FIG. 27 shows an exemplary operation of the conventional radio terminal.

As shown in FIG. 26, the radio terminal 2001 includes at least a reception unit 2002 for receiving control information transmitted from the radio base station by using radio and push type distribution information transmitted from that radio base station by using radio to this radio terminal 2001 according to a request from a device other than this radio terminal 2001 (that is, without a request from this radio terminal 2001), and a reception control unit 2003 for controlling the reception unit 2002. In addition to these, the radio terminal 2001 may include an information memory device for storing the information received through the reception unit 2002 and a battery for supplying power to the radio terminal 2001.

The reception unit 2002 of the radio terminal 2001 receives the control information broadcasted from the radio base station by using radio, and the reception control unit 2003 judges whether this radio terminal 2001 itself is located within a service area or not according to whether the control information can be received or not (step S91). In the case where this radio terminal 2001 is located within a service area, the reception control unit 2003 controls the reception unit 2002 to receive the push type distribution information transmitted from the radio base station (step S92).

In the case of providing each railway station with a radio base station (having a service area that covers a range of that station) and transmitting the push type distribution information such as advertisement information or regional information related to a vicinity of that station from that radio base station, for example, the radio terminal carried around by a passenger on board will receive the push type distribution information whenever a train stops at a station or passes a station according to the above described operation. In other words, the radio terminal of a passenger who utilizes a route on which there are many stations with the radio base stations for transmitting the push type distribution information provided thereon will end up receiving a large amount of advertisement information and the like very frequently, which means a large amount of undesired information for a user of that radio terminal will be received, so that there is a problem that the handling of the radio terminal becomes poor.

Also, the radio terminal will wastefully consume its battery power and a memory capacity of its information memory device by receiving a large amount of the advertisement information and the like that is transmitted regardless of the user's preference, so that there can be cases where it becomes impossible to receive any information by the time of receiving the desired information of the user because of the shortage of a remaining battery power or an available memory capacity of the information memory device.

Moreover, the advertisement information or the like of a specific station is going to be transmitted even to the radio terminal of a passenger who has a very little possibility for actually getting on or off the train, so that it is going to be a very inefficient advertisement distribution.

Thus the conventional radio terminal in the radio communication system in which radio base stations for transmitting push type distribution information are arranged at spots will receive and store a large amount of information whenever the service area is changed as a user who is carrying around that radio terminal moves, so that there are problems that the information cannot be utilized effectively from a viewpoint of a user side, that the battery power or the memory capacity will be wasted from a viewpoint of a radio terminal side, and that the provided information will not be utilized effectively by users from a viewpoint of an information provider side.

SUMMARY OF THE INVENTION

It is therefore an object of the present invention to provide a radio terminal and an information reception control method capable of effectively utilizing received and stored push type distribution information.

It is another object of the present invention to provide a radio terminal and an information reception control method capable of receiving push type distribution information while preventing wasteful consumption of the battery power or the memory capacity.

According to one aspect of the present invention there is provided a radio terminal, comprising: a reception unit configured to receive push type distribution information from a radio base station which is transmitting the push type distribution information related to an area to which the radio base station belongs, without requiring a request from the radio terminal; a location recognition unit configured to carry out a recognition related to an area in which the radio terminal is located; and a reception control unit configured to determine whether or not to receive the push type distribution information according to a recognition result of the location recognition unit, and control the reception unit according to a determination result.

According to another aspect of the present invention there is provided an information reception control method for a radio terminal which is capable of receiving push type distribution information from a radio base station which is transmitting the push type distribution information related to an area to which the radio base station belongs, without requiring a request from the radio terminal, the method comprising the step of: carrying out a recognition related to an area in which the radio terminal is located; determining whether or not to receive the push type distribution information according to a recognition result obtained by the carrying out step; and receiving the push type distribution information only when the determining step determines to receive the push type distribution information.

According to another aspect of the present invention there is provided a computer usable medium having computer readable program codes embodied therein for causing a computer to function as a radio terminal, the computer readable program codes include: a first computer readable program code for causing said computer to receive push type distribution information from a radio base station which is transmitting the push type distribution information related to an area to which the radio base station belongs, without requiring a request from the radio terminal; a second computer readable program code for causing said computer to carry out a recognition related to an area in which the radio terminal is located; and a third computer readable program code for causing said computer to determine whether or not to receive the push type distribution information according to a recongition result of the second computer readable program code, and control the first computer readable program code according to a determination result.

Other features and advantages of the present invention will become apparent from the following description taken in conjunction with the accompanying drawings.

DETAILED DESCRIPTION OF THE PREFERRED EMBODIMENTS

Referring now to FIG. 1 to FIG. 25, various embodiments of a radio terminal and an information reception control method according to the present invention will be described in detail.

(First Embodiment)

First, with references to FIG. 1 and FIG. 2, the first embodiment of the present invention will be described.

Figure 1:
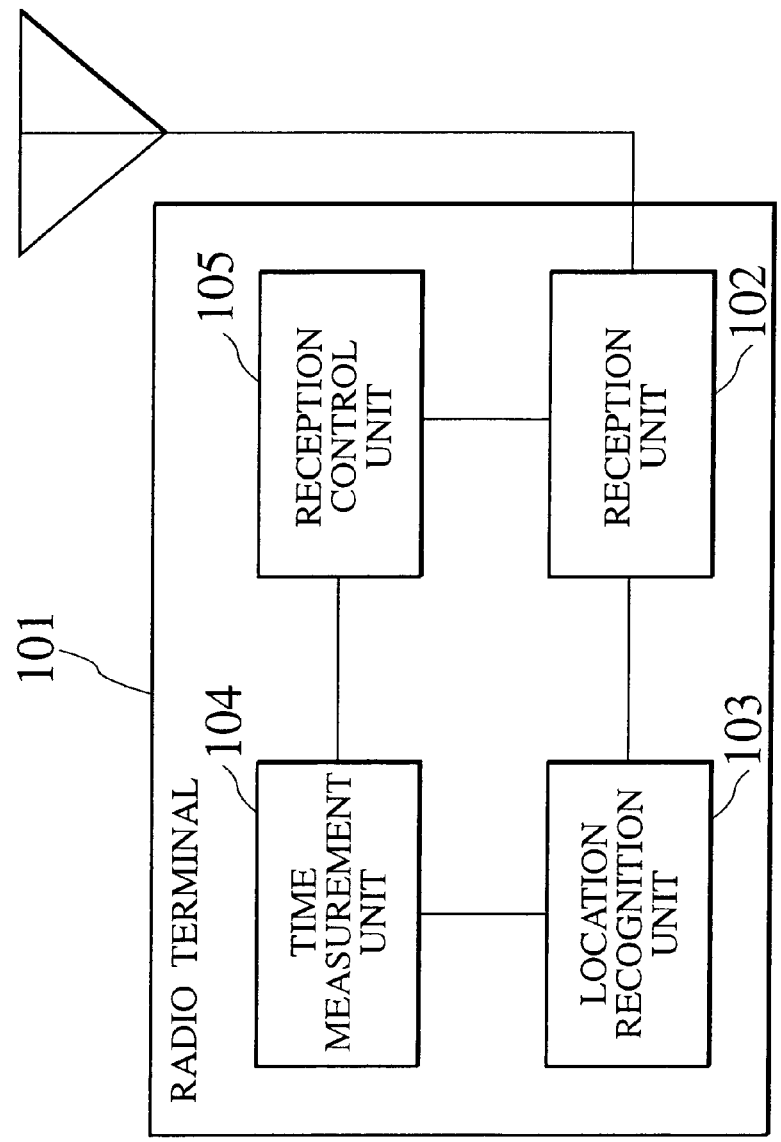
FIG. 1 is a block diagram showing an exemplary configuration of a radio terminal according to the first embodiment of the present invention.
Figure 2:
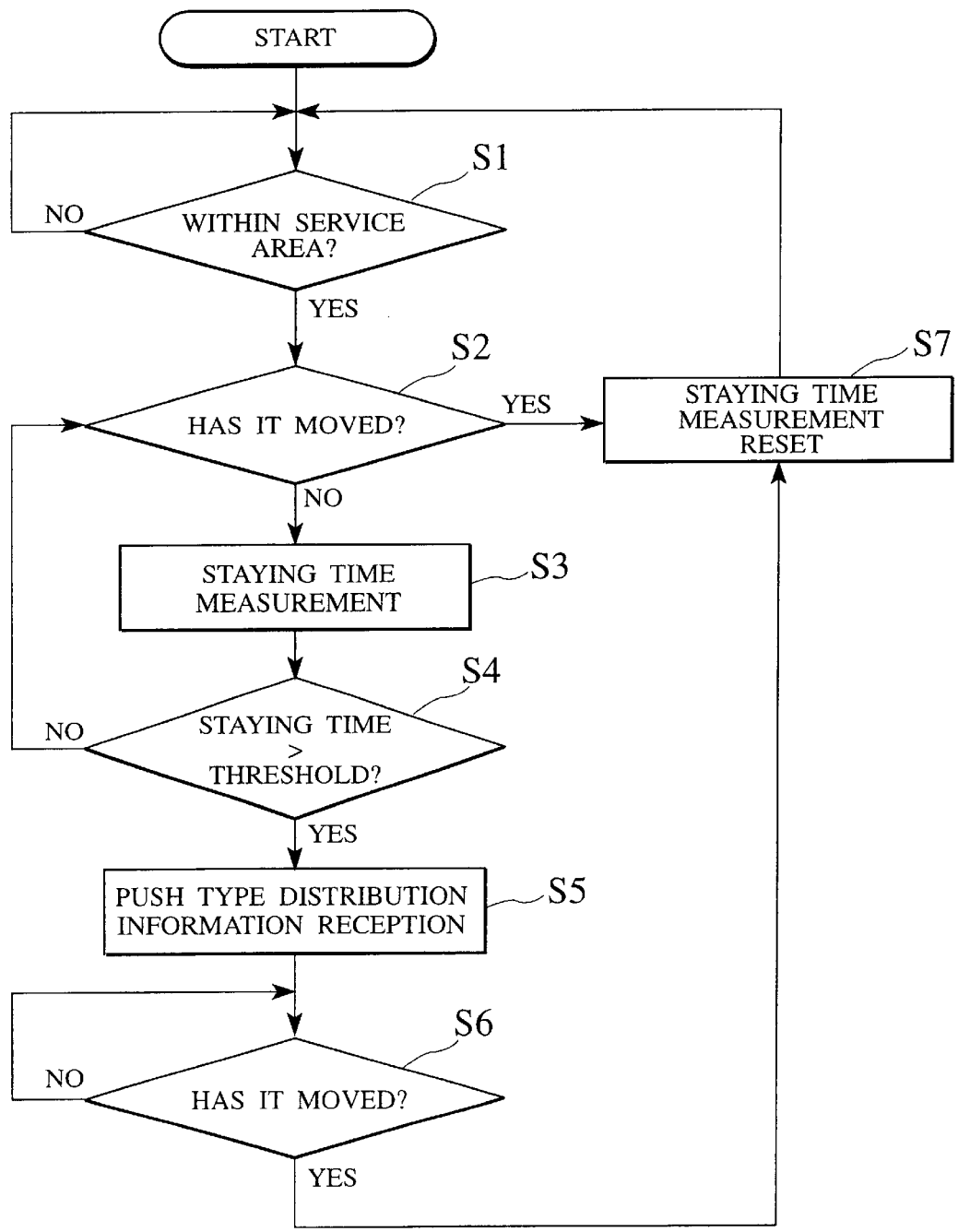
FIG. 2 is a flow chart showing an exemplary operation of a radio terminal according to the first and second embodiments of the present invention.

FIG. 1 shows an exemplary configuration of the radio terminal according to the first embodiment, which is a radio terminal that receives push type distribution information when the radio terminal stays in the same area for more than a prescribed period of time. FIG. 2 shows an exemplary operation of the radio terminal of the first embodiment.

As shown in FIG. 1, the radio terminal 101 includes at least a reception unit 102 for receiving control information transmitted from a radio base station by using radio and push type distribution information transmitted from that radio base station by using radio to this radio terminal 101 according to a request from a device other than this radio terminal 101 (that is, without a request from this radio terminal 101), a location recognition unit 103 for recognizing a location of this radio terminal 101 itself by utilizing the control information received by the reception unit 102, a time measurement unit 104 for measuring a period of time for which this radio terminal 101 stays in the same area by utilizing information regarding a location recognized by the location recognition unit 103, and a reception control unit 105 for controlling the reception unit 102 to receive the push type distribution information transmitted from the radio base station when the period of time measured by the time measurement unit 104 exceeds a prescribed period of time.

Note that regarding an area of the push type distribution information, there can be a case where the same area is covered by one radio base station and a case where the same area is covered by a plurality of radio base stations.

Also, in the case of providing the radio base station at a railway station, there can be a case where an entire railway station including a vicinity of platform, a vicinity of entrance and a vicinity of exit is covered as the same area and a case where only a part of the railway station is covered as the same area. There can also be a case where different areas are set for a platform and a concourse, or for a vicinity of west gate and a vicinity of east gate, for example (that is, there can be a case where a plurality of areas are provided in the same railway station).

These points are equally valid for the subsequent embodiments as well.

An exemplary operation of the radio terminal 101 of FIG. 1 will now be described along a flow chart shown in FIG. 2.

The reception unit 102 of the radio terminal 101 is receiving the control information broadcasted from the radio base station by using radio, and judges whether the radio terminal 101 itself is located within a service area or not according to whether the control information can be received or not (step S1).

In the case where the radio terminal 101 is located within the service area, the location recognition unit 103 recognizes the location of the radio terminal 101 by utilizing a radio base station identifier or the like that is contained in the control information. In addition, the time measurement unit 104 monitors whether a change in this location information occurs or not, and judges whether the radio terminal 101 is staying in the same area or not (steps S2 to S4).

Here, the time measurement unit 104 judges whether or not the radio terminal 101 is moving across plural areas of different radio base stations or not, or whether or not the radio terminal 101 is moving across plural location registration areas each of which is formed by a plurality of radio base stations, for example. Also, in the case where the radio base station is provided at a railway station, the time measurement unit 104 judges whether or not the radio terminal 101 is staying inside a prescribed railway station, or whether or not the radio terminal 101 has moved to a new railway station for such a reason as that a user is on board, for example.

When it is judged that the radio terminal 101 has moved to a new area at the step S2, the time measurement unit 104 terminates the measurement of a staying time and resets the measured value to an initial value (step S7). The operation then returns to the step S1.

On the other hand, when it is judged that the radio terminal 101 has not moved from the same service area, that is the radio terminal 101 is staying in the same area, the time measurement unit 104 carries out the measurement of the staying time (step S3). The time measurement unit 104 continues this measurement of the staying time while it is judged that the radio terminal 101 is staying in the same area, until the staying time exceeds a prescribed threshold at the step S4.

When the staying time exceeds the prescribed threshold at the step S4, the reception control unit 105 controls the reception unit 102 to receive the push type distribution information transmitted by the radio base station (step S5). This push type distribution information can be advertisement information or the like that is broadcasted by the radio base station, for example.

Note that a method for measuring the staying time at the time measurement unit 104 can be a method for simply measuring a period of time, or a method for measuring the number of times for receiving the control information that is periodically broadcasted by the radio base station by using radio. In the latter case, when the broadcast control information containing the same radio base station identifier is received consecutively over a prescribed number of times, it is judged that the radio terminal 101 is staying in the same area and the reception control unit 105 controls the reception unit 102 to receive the push type distribution information.

When the radio terminal 101 has moved from that service area (step S6), the operation returns to the step S1.

Note that the prescribed threshold used in deciding whether or not to receive the push type distribution information can be a preset constant value or a value that cannot be changed by the user, but it is also possible to make this threshold suitably adjustable by the user.

As described, the radio terminal of the first embodiment will receive the push type distribution information transmitted by the radio base station only when the radio terminal stays in the same area for more than a prescribed period of time. Consequently, it is possible to prevent the radio terminal from excessively frequently receiving the push type distribution information that is transmitted by the radio base station regardless of a request of the radio terminal, so that it is possible to prevent wasteful consumption of a battery power or a memory capacity of the radio terminal.

Also, in the case of providing the radio base station at a railway station, for example, the radio terminal owned by a passenger who gets on or off the train at this railway station will receive the push type distribution information, whereas the radio terminal owned by a passenger who is on a train that passes this railway station or a passenger who remains on a train that stops at this railway station for a short period of time will not receive the push type distribution information. Consequently, in the case of distributing the advertisement information or the like related to a vicinity of each railway station as the push type distribution information at each railway station, the advertisement information will be distributed only to those passengers who get on or off the trains at this railway station, so that the effective advertisement distribution becomes possible.

In addition, it becomes possible not to distribute the advertisement information to those passengers who do not get on or off the trains at this railway station, so that it becomes possible to prevent the radio terminal from receiving an excessively large amount of advertisement information and thereby improve the handling of the radio terminal for the user.

(Second Embodiment)

Next, with references to FIG. 2 and FIG. 3, the second embodiment of the present invention will be described.

Figure 3:
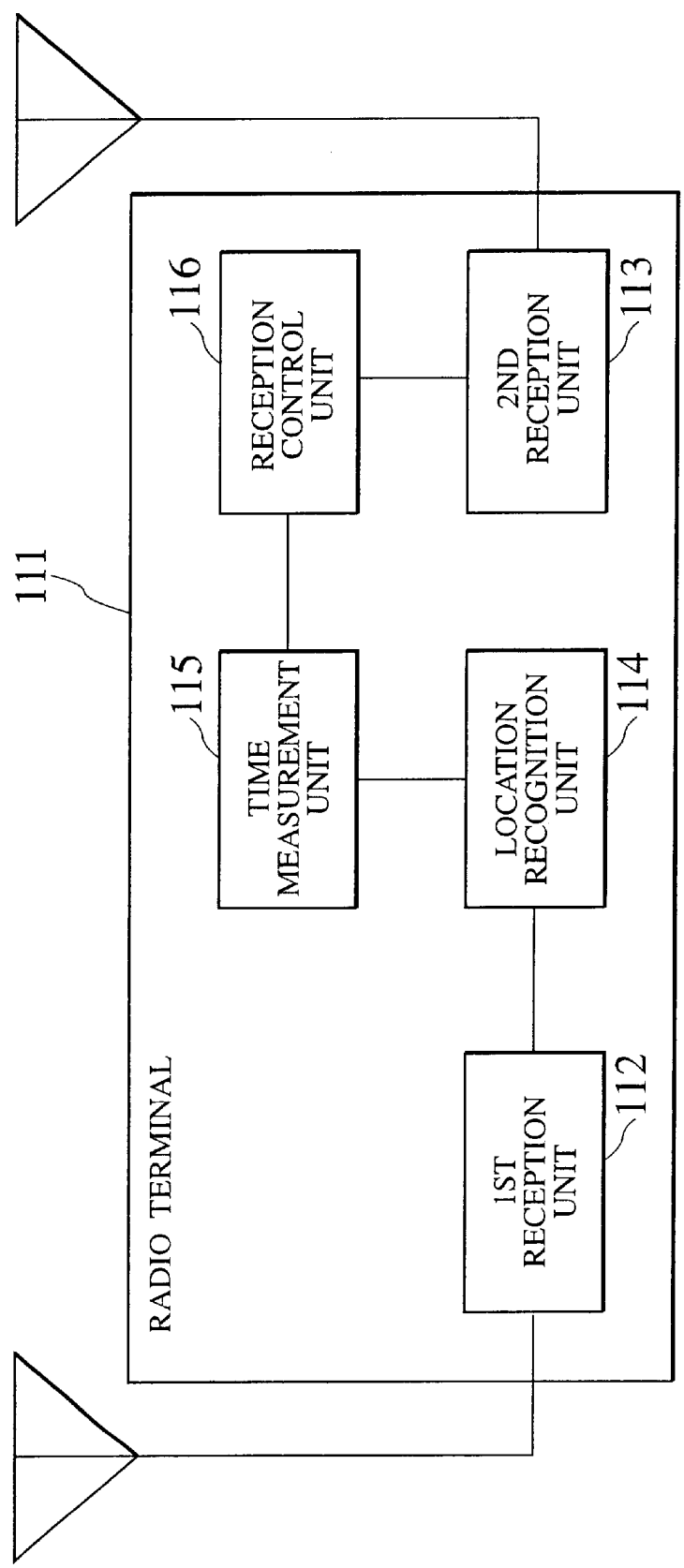
FIG. 3 is a block diagram showing an exemplary configuration of a radio terminal according to the second embodiment of the present invention.

FIG. 3 shows an exemplary configuration of the radio terminal according to the second embodiment, which is a radio terminal that receives push type distribution information when the radio terminal stays in the same area for more than a prescribed period of time. FIG. 2 shows an exemplary operation of the radio terminal of the second embodiment.

The first embodiment is directed to the case of receiving the control information from the radio base station that transmits the push type distribution information, whereas the second embodiment is directed to the case of receiving the control information from a radio base station of a radio communication system which is different from the radio base station that transmits the push type distribution information.

As shown in FIG. 3, the radio terminal 111 includes at least a first reception unit 112 for receiving control information transmitted by using radio from a first radio base station that is capable of transmitting information by using radio, a second reception unit 113 for receiving push type distribution information transmitted by using radio from a second radio base station that is capable of transmitting information faster than the first radio base station, to this radio terminal 111 according to a request from a device other than this radio terminal 111 (that is, without a request from this radio terminal 111), a location recognition unit 114 for recognizing a location of this radio terminal 111 itself by utilizing the control information received by the first reception unit 112, a time measurement unit 115 for measuring a period of time for which this radio terminal 111 stays in the same area by utilizing information regarding a location recognized by the location recognition unit 114, and a reception control unit 116 for controlling the second reception unit 113 to receive the push type distribution information transmitted from the second radio base station when the period of time measured by the time measurement unit 115 exceeds a prescribed period of time.

An exemplary operation of the radio terminal 111 of FIG. 3 will now be described along a flow chart shown in FIG. 2.

The first reception unit 112 of the radio terminal 111 is receiving the control information broadcasted from the first radio base station by using radio, and judges whether the radio terminal 111 itself is located within a service area in which information from the second radio base station can be received or not, by utilizing the control information (step S1). This can be realized by including information indicating whether the second radio base station exists nearby or not in the control information broadcasted by the first radio base station, for example.

In the case where the radio terminal 111 is located within the service area, the location recognition unit 114 recognizes the location of the radio terminal 111 by utilizing a radio base station identifier or the like of the first radio base station that is contained in the control information. Here, the location recognition unit 114 may recognize the location of the radio terminal 111 by utilizing a radio base station identifier or the like of the second radio base station that is contained in the control information transmitted by the second radio base station.

In addition, the time measurement unit 115 monitors whether a change in this location information occurs or not, and judges whether the radio terminal 111 is staying in the same area or not (steps S2 to S4).

Here, the time measurement unit 115 judges whether or not the radio terminal 111 is moving across plural areas of different radio base stations or not, or whether or not the radio terminal 111 is moving across plural location registration areas each of which is formed by a plurality of radio base stations, for example. Also, in the case where the radio base station is provided at a railway station, the time measurement unit 115 judges whether or not the radio terminal 111 is staying inside a prescribed railway station, or whether or not the radio terminal 111 has moved to a new railway station for such a reason as that a user is on board, for example.

When it is judged that the radio terminal 111 has moved to a new area at the step S2, the time measurement unit 115 terminates the measurement of a staying time and resets the measured value to an initial value (step S7). The operation then returns to the step S1.

On the other hand, when it is judged that the radio terminal 111 has not moved from the same service area, that is the radio terminal 111 is staying in the same area, the time measurement unit 115 carries out the measurement of the staying time (step S3). The time measurement unit 115 continues this measurement of the staying time while it is judged that the radio terminal 111 is staying in the same area, until the staying time exceeds a prescribed threshold at the step S4.

When the staying time exceeds the prescribed threshold at the step S4, the reception control unit 116 controls the second reception unit 113 to receive the push type distribution information transmitted by the second radio base station (step S5). This push type distribution information can be advertisement information or the like that is broadcasted by the radio base station, for example.

Note that a method for measuring the staying time at the time measurement unit 115 can be a method for simply measuring a period of time, or a method for measuring the number of times for receiving the control information that is periodically broadcasted by the first or second radio base station by using radio. In the latter case, when the broadcast control information containing the same radio base station identifier is received consecutively over a prescribed number of times, it is judged that the radio terminal 111 is staying in the same area and the reception control unit 116 controls the second reception unit 113 to receive the push type distribution information.

When the radio terminal 111 has moved from that service area (step S6), the operation returns to the step S1.

Note that, similarly as in the first embodiment, the prescribed threshold used in deciding whether or not to receive the push type distribution information can be a preset constant value or a value that cannot be changed by the user, but it is also possible to make this threshold suitably adjustable by the user.

As described, the radio terminal of the second embodiment will receive the push type distribution information transmitted by the radio base station only when the radio terminal stays in the same area for more than a prescribed period of time. Consequently, it is possible to prevent the radio terminal from excessively frequently receiving the push type distribution information that is transmitted by the radio base station regardless of a request of the radio terminal, so that it is possible to prevent wasteful consumption of a battery power or a memory capacity of the radio terminal.

Also, in the case of providing the radio base station at a railway station, for example, the radio terminal owned by a passenger who gets on or off the train at this railway station will receive the push type distribution information, whereas the radio terminal owned by a passenger who is on a train that passes this railway station or a passenger who remains on a train that stops at this railway station for a short period of time will not receive the push type distribution information. Consequently, in the case of distributing the advertisement information or the like related to a vicinity of each railway station as the push type distribution information at each railway station, the advertisement information will be distributed only to those passengers who get on or off the trains at this railway station, so that the effective advertisement distribution becomes possible.

In addition, it becomes possible not to distribute the advertisement information to those passengers who do not get on or off the trains at this railway station, so that it becomes possible to prevent the radio terminal from receiving an excessively large amount of advertisement information and thereby improve the handling of the radio terminal for the user.

(Third Embodiment)

Figure 5:
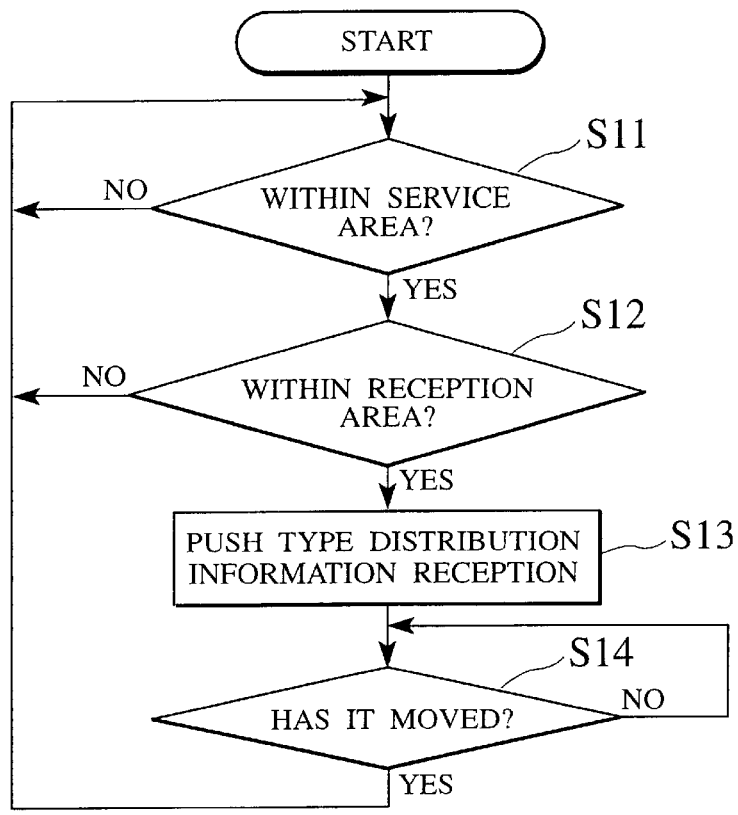
FIG. 5 is a flow chart showing an exemplary operation of a radio terminal according to the third to eighth embodiments of the present invention.
Figure 6:
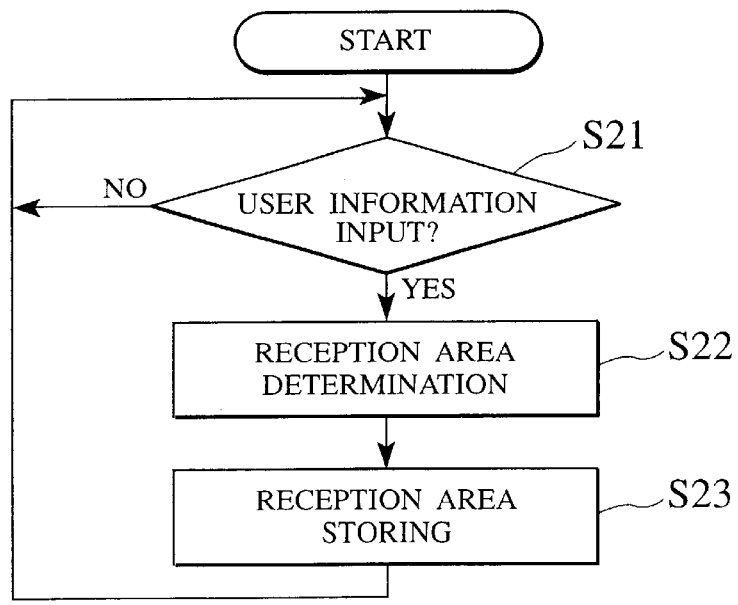
FIG. 6 is a flow chart showing an exemplary operation of a radio terminal according to the third and fifth embodiments of the present invention.

Next, with references to FIG. 4 to FIG. 6, the third embodiment of the present invention will be described.

Figure 4:
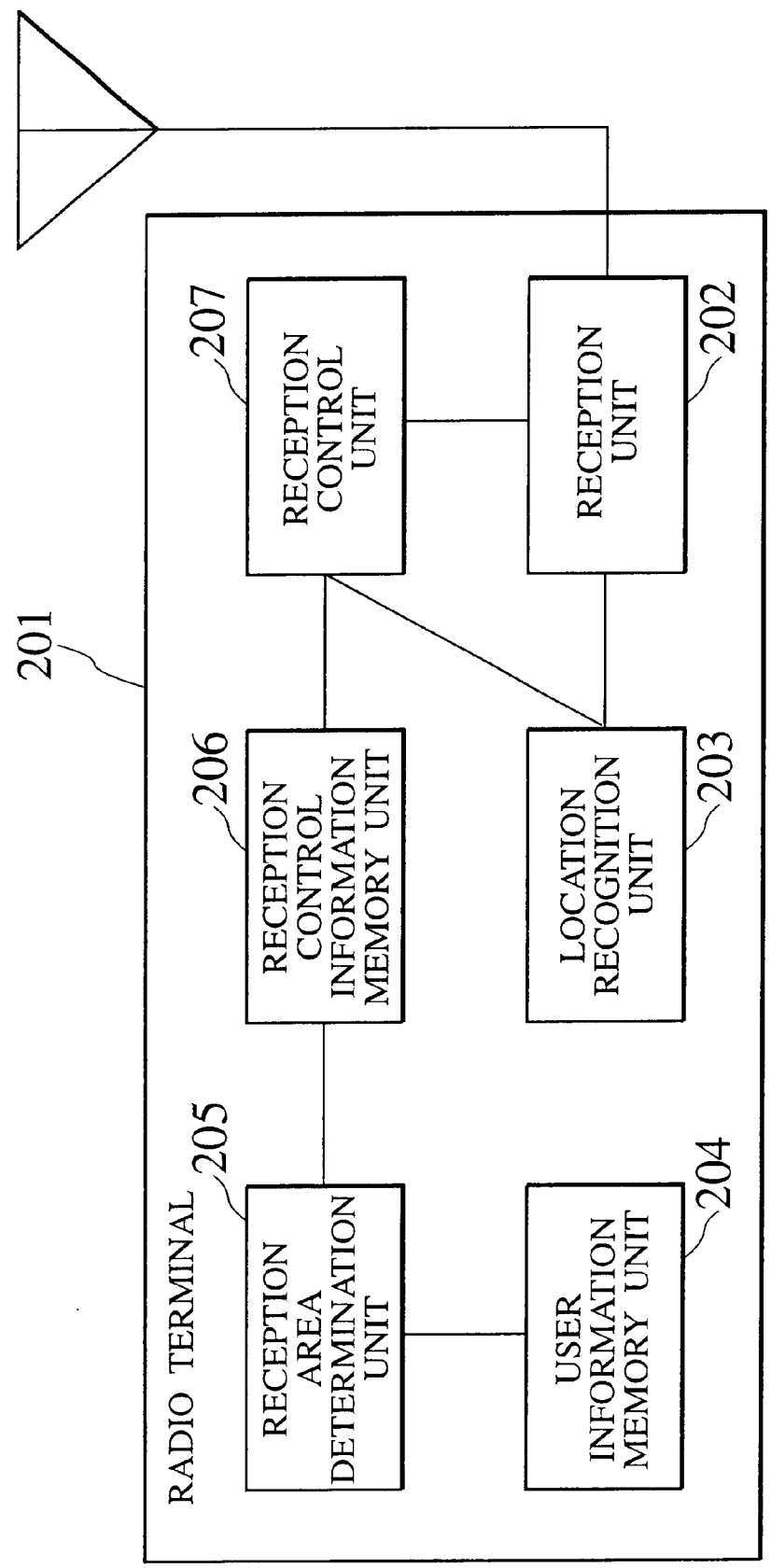
FIG. 4 is a block diagram showing an exemplary configuration of a radio terminal according to the third embodiment of the present invention.

FIG. 4 shows an exemplary configuration of the radio terminal according to the third embodiment, which is a radio terminal that receives push type distribution information only at areas where the reception of push type distribution information is useful for a user such as vicinities of a user's resident area and a user's place of employment, according to information regarding a user of the radio terminal. FIG. 5 and FIG. 6 show exemplary operations of the radio terminal of the third embodiment.

As shown in FIG. 4, the radio terminal 201 includes at least a reception unit 202 for receiving control information transmitted from a radio base station by using radio and push type distribution information transmitted from that radio base station by using radio to this radio terminal 201 according to a request from a device other than this radio terminal 201 (that is, without a request from this radio terminal 201), a location recognition unit 203 for recognizing a location of this radio terminal 201 itself by utilizing the control information received by the reception unit 202, a user information memory unit 204 for storing information regarding the user of this radio terminal 201 such as addresses, postal codes, telephone numbers, etc., of the user's home, place of employment, school, etc., for example, a reception area determination unit 205 for determining areas for receiving the push type distribution information by utilizing the information stored in the user information memory unit 204, a reception control information memory unit 206 for storing information regarding the areas determined by the reception area determination unit 205, and a reception control unit 207 for controlling the reception unit 202 by judging whether or not to receive the push type distribution information transmitted from the radio base station according to the location recognized by the location recognition unit 203 and the information stored in the reception control information memory unit 206.

Exemplary operations of the radio terminal 201 of FIG. 4 will now be described along flow charts shown in FIG. 5 and FIG. 6.

The reception unit 202 of the radio terminal 201 is receiving the control information broadcasted from the radio base station by using radio, and judges whether the radio terminal 201 itself is located within a service area or not according to whether the control information can be received or not (step S11).

In the case where the radio terminal 201 is located within the service area, the location recognition unit 203 recognizes the location of the radio terminal 201 by utilizing a radio base station identifier or the like that is contained in the control information. The reception control information memory unit 206 is storing identifiers of areas for receiving the push type distribution information such as identifiers of radio base stations or identifiers of areas defined to be formed by a plurality of radio base stations, and the reception control unit 207 judges whether or not to receive the push type distribution information by comparing this information stored in the reception control information memory unit 206 with the location information recognized by the location recognition unit 203 (step S12).

When the reception control unit 207 judges that the push type distribution information should be received, the reception unit 202 receives the push type distribution information (step S13), or otherwise the reception unit 202 does not receive the push type distribution information.

The above operation is carried out whenever the radio terminal 201 moves to another area, such that the push type distribution information is received according to the need.

On the other hand, when the user of the radio terminal 201 enters the user information (such as addresses, postal codes, telephone numbers, etc., of the user's home, place of employment, school, etc., for example) into the user information memory unit 204 (step S21), the reception area determination unit 205 converts this user information into identifiers of radio base stations or identifiers of areas defined to be formed by a plurality of radio base stations that correspond to the areas for receiving the push type distribution information (step S22), and the reception control information memory unit 206 stores these identifiers (step S23). Note that this conversion may be carried out at the other timings such as regular timings, for example.

For example, this can be done in such a manner that, when the user enters the user's home and place of employment, a nearby railway station of the home and a nearby railway station of the place of employment are obtained by referring to a built-in conversion table, and converted into identifiers of radio base stations corresponding to these railway stations, and then these identifiers are stored. Here, in addition to the nearby railway stations of the home and the place of employment entered by the user, it is also possible to obtain transfer railway stations (or a group of candidate transfer railway stations when there are more than one commuting routes from the home to the place of employment) that can be determines from the nearby railway stations, convert them into identifiers of radio base stations corresponding to these transfer railway stations, and then store these identifiers. In addition, it is also possible to add some other railway stations that satisfy a prescribed condition (such as railway stations which are to be passed in commuting between the home and the place of employment but which are likely to be stopped by for the purpose of shopping or the like in general, for example).

The above described example is directed to the case of receiving the push type distribution information at railway stations that are required or likely be used by the user from a viewpoint of commuting between the home and the place of employment, but it is obviously also possible to select the reception areas or the reception target railway stations from various other viewpoints. For example, information regarding interests or preferences of the user may be used as the information regarding the user. Also, information on a schedule of the user may be used as the information regarding the user. It is also possible to use these various cases in suitable combinations.

In this way, it becomes possible for the radio terminal 201 to select the nearby railway station of the home and the nearby railway station of the place of employment of the user and receive the push type distribution information such as the advertisement information for vicinities of these railway stations, for example.

As described, the radio terminal of the third embodiment will receive the push type distribution information transmitted by the radio base station only within prescribed areas. In particular, the push type distribution information will be received according to addresses of the home and the place of employment, the schedule information, etc., of the user of the radio terminal. Consequently, it is possible to prevent the radio terminal from excessively frequently receiving the push type distribution information that is transmitted by the radio base station regardless of a request of the radio terminal, so that it is possible to prevent wasteful consumption of a battery power or a memory capacity of the radio terminal.

Also, in the case of providing the radio base station at a railway station, for example, the radio terminal owned by the user will receive the push type distribution information by selecting railways stations that are normally utilized by the user such as a nearby railway station of user's home, a nearby railway station of the user's place of employment and a nearby railway station of the user's school, or railway stations often utilized at a time of going out, while the radio terminal will not receive the push type distribution information at the other railway stations such as railway stations to be passed by the user in commuting between the home and the place of employment. Consequently, in the case of distributing the advertisement information or the like related to a vicinity of each railway station as the push type distribution information at each railway station, the advertisement information will be distributed only to those passengers who get on or off the trains at this railway station, so that the effective advertisement distribution becomes possible.

(Fourth Embodiment)

Next, with references to FIG. 5, FIG. 7 and FIG. 8, the fourth embodiment of the present invention will be described.

Figure 7:
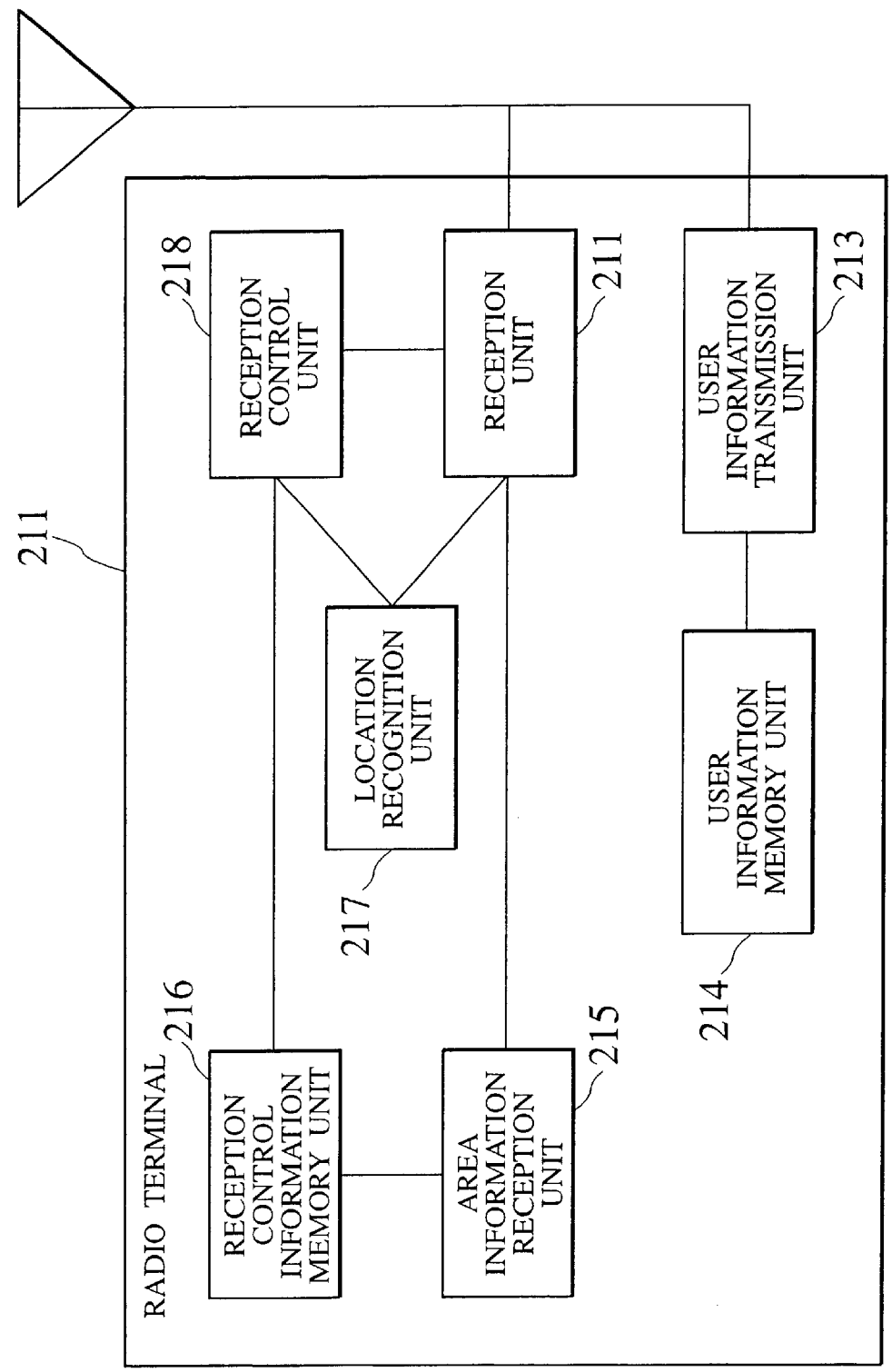
FIG. 7 is a block diagram showing an exemplary configuration of a radio terminal according to the fourth embodiment of the present invention.
Figure 8:
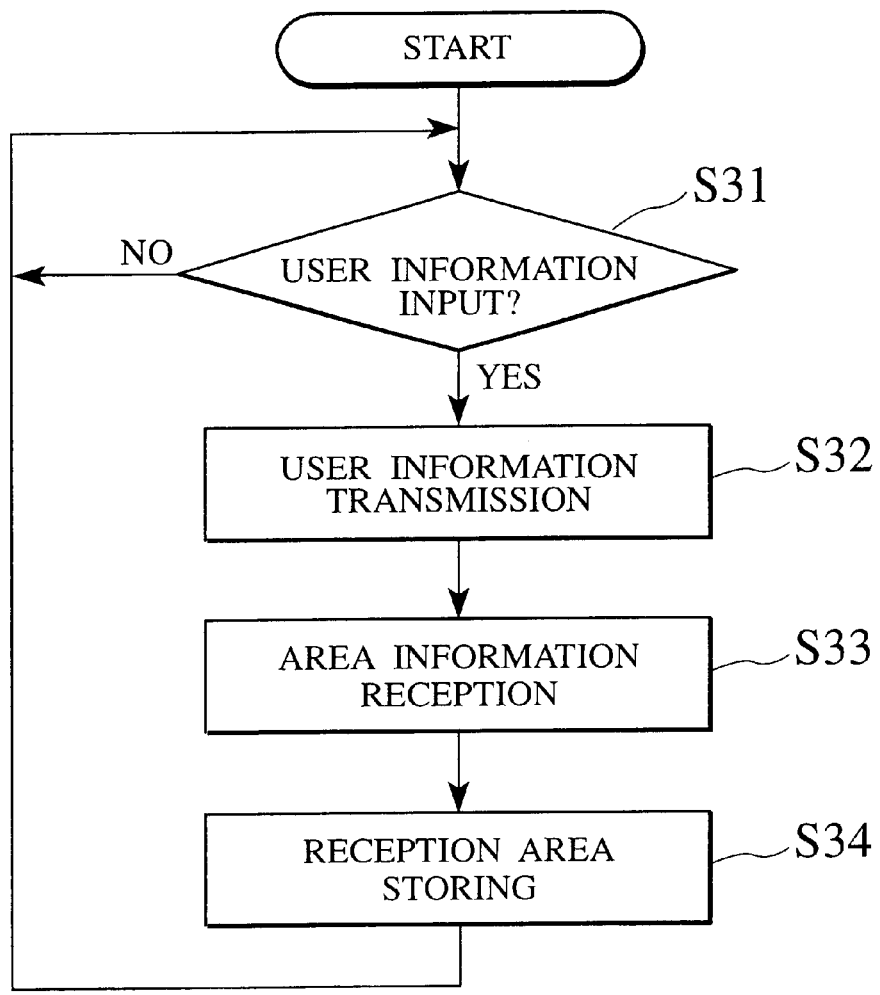
FIG. 8 is a flow chart showing an exemplary operation of a radio terminal according to the fourth and sixth embodiments of the present invention.

FIG. 7 shows an exemplary configuration of the radio terminal according to the fourth embodiment, which is a radio terminal that receives push type distribution information only at areas where the reception of push type distribution information is useful for a user such as vicinities of a user's resident area and a user's place of employment, according to information regarding a user of the radio terminal. FIG. 5 and FIG. 8 show exemplary operations of the radio terminal of the fourth embodiment.

The third embodiment is directed to the case where the information regarding the reception areas is obtained inside the radio terminal from the information regarding the user, whereas the fourth embodiment is directed to the case where the information regarding the reception areas is obtained by a prescribed device within a network.

As shown in FIG. 7, the radio terminal 211 includes at least a reception unit 212 for receiving control information transmitted from a radio base station by using radio and push type distribution information transmitted from that radio base station by using radio to this radio terminal 211 according to a request from a device other than this radio terminal 211 (that is, without a request from this radio terminal 211), a location recognition unit 217 for recognizing a location of this radio terminal 211 itself by utilizing the control information received by the reception unit 212, a user information memory unit 214 for storing information regarding the user of this radio terminal 211 such as addresses, postal codes, telephone numbers, etc., of the user's home, place of employment, school, etc., for example, a user information transmission unit 213 for transmitting the information stored in the user information memory unit 214 through a network, an area information reception unit 215 for receiving information regarding areas in which the radio terminal 211 receives the push type distribution information that is determined by a prescribed device in the network according to the information transmitted by the user information transmission unit 213, a reception control information memory unit 216 for storing the information regarding the areas received by the area information reception unit 215, and a reception control unit 218 for controlling the reception unit 212 by judging whether or not to receive the push type distribution information transmitted from the radio base station according to the location recognized by the location recognition unit 217 and the information stored in the reception control information memory unit 216.

Exemplary operations of the radio terminal 211 of FIG. 7 will now be described along flow charts shown in FIG. 5 and FIG. 8.

The reception unit 212 of the radio terminal 211 is receiving the control information broadcasted from the radio base station by using radio, and judges whether the radio terminal 211 itself is located within a service area or not according to whether the control information can be received or not (step S11).

In the case where the radio terminal 211 is located within the service area, the location recognition unit 217 recognizes the location of the radio terminal 211 by utilizing a radio base station identifier or the like that is contained in the control information. The reception control information memory unit 216 is storing identifiers of areas for receiving the push type distribution information such as identifiers of radio base stations or identifiers of areas defined to be formed by a plurality of radio base stations, and the reception control unit 218 judges whether or not to receive the push type distribution information by comparing this information stored in the reception control information memory unit 216 with the location information recognized by the location recognition unit 217 (step S12).

When the reception control unit 218 judges that the push type distribution information should be received, the reception unit 212 receives the push type distribution information (step S13), or otherwise the reception unit 212 does not receive the push type distribution information.

The above operation is carried out whenever the radio terminal 211 moves to another area, such that the push type distribution information is received according to the need.

On the other hand, when the user of the radio terminal 211 enters the user information into the user information memory unit 214 (step S31), the user information transmission unit 213 transmits this user information to the prescribed device in the network (step S32). Here, the user information can be addresses, postal codes, telephone numbers, etc., of the user's home, place of employment, school, etc., for example. Note that this user information transmission may be carried out at the other timings such as regular timings, for example.

Upon receiving the user information, the prescribed device in the network converts this user information into identifiers of radio base stations or identifiers of areas defined to be formed by a plurality of radio base stations that correspond to the areas in which the radio terminal 211 receives the push type distribution information, and transmits them to the radio terminal 211.

At the radio terminal 211, this information is received by the area information reception unit 215 through the reception unit 212 (step S33), and the reception control information memory unit 216 stores these identifiers (step S34).

In this way, it becomes possible for the radio terminal 211 to select the nearby railway station of the home and the nearby railway station of the place of employment of the user and receive the push type distribution information such as the advertisement information for vicinities of these railway stations, for example.

Note that various methods can be used as a method of obtaining the base station identifiers or the like from the information regarding the user, similarly as in the third embodiment.

As described, the radio terminal of the fourth embodiment will receive the push type distribution information transmitted by the radio base station only within prescribed areas. In particular, the push type distribution information will be received according to addresses of the home and the place of employment, the schedule information, etc., of the user of the radio terminal. Consequently, it is possible to prevent the radio terminal from excessively frequently receiving the push type distribution information that is transmitted by the radio base station regardless of a request of the radio terminal, so that it is possible to prevent wasteful consumption of a battery power or a memory capacity of the radio terminal.

Also, in the case of providing the radio base station at a railway station, for example, the radio terminal owned by the user will receive the push type distribution information by selecting railways stations that are normally utilized by the user such as a nearby railway station of user's home, a nearby railway station of the user's place of employment and a nearby railway station of the user's school, or railway stations often utilized at a time of going out, while the radio terminal will not receive the push type distribution information at the other railway stations such as railway stations to be passed by the user in commuting between the home and the place of employment. Consequently, in the case of distributing the advertisement information or the like related to a vicinity of each railway station as the push type distribution information at each railway station, the advertisement information will be distributed only to those passengers who get on or off the trains at this railway station, so that the effective advertisement distribution becomes possible.

(Fifth Embodiment)

Next, with references to FIG. 5, FIG. 6 and FIG. 9, the fifth embodiment of the present invention will be described.

Figure 9:
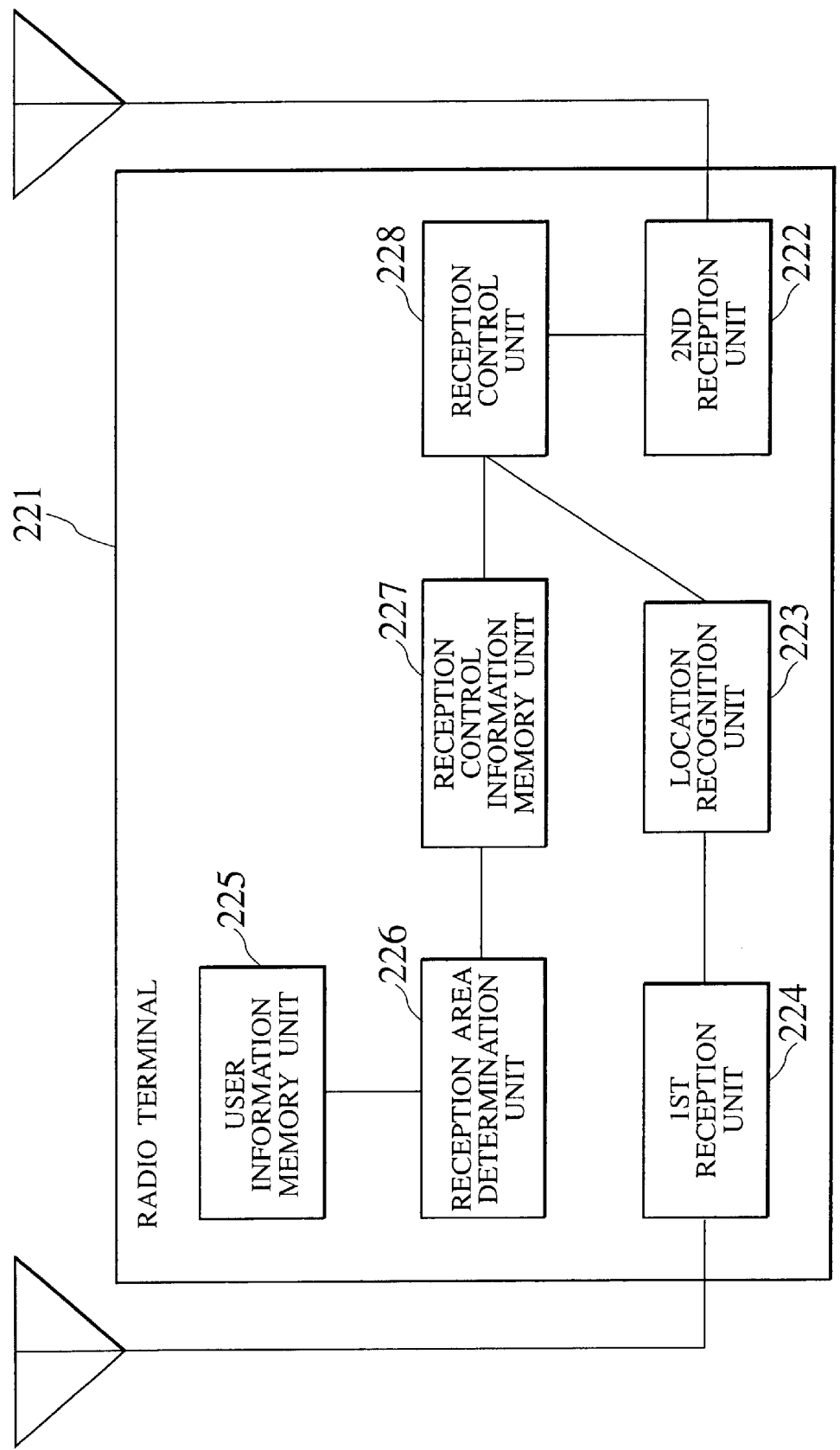
FIG. 9 is a block diagram showing an exemplary configuration of a radio terminal according to the fifth embodiment of the present invention.

FIG. 9 shows an exemplary configuration of the radio terminal according to the fifth embodiment, which is a radio terminal that receives push type distribution information only at areas where the reception of push type distribution information is useful for a user such as vicinities of a user's resident area and a user's place of employment, according to information regarding a user of the radio terminal. FIG. 5 and FIG. 6 show exemplary operations of the radio terminal of the fifth embodiment.

The fifth embodiment is a modification of the third embodiment, which is directed to the case where the control information is received by a radio communication system different from the radio base station that transmits the push type distribution information.

As shown in FIG. 9, the radio terminal 221 includes at least a first reception unit 224 for receiving control information transmitted by using radio from a first radio base station that is capable of transmitting information by using radio, a second reception unit 222 for receiving push type distribution information transmitted by using radio from a second radio base station that is capable of transmitting information faster than the first radio base station, to this radio terminal 221 according to a request from a device other than this radio terminal 221 (that is, without a request from this radio terminal 221), a location recognition unit 223 for recognizing a location of this radio terminal 221 itself by utilizing the control information received by the first reception unit 224, a user information memory unit 225 for storing information regarding the user of this radio terminal 221 such as addresses, postal codes, telephone numbers, etc., of the user's home, place of employment, school, etc., for example, a reception area determination unit 226 for determining areas for receiving the push type distribution information by utilizing the information stored in the user information memory unit 225, a reception control information memory unit 227 for storing information regarding the areas determined by the reception area determination unit 226, and a reception control unit 228 for controlling the second reception unit 222 by judging whether or not to receive the push type distribution information transmitted from the second radio base station according to the location recognized by the location recognition unit 223 and the information stored in the reception control information memory unit 227.

Exemplary operations of the radio terminal 221 of FIG. 9 will now be described along flow charts shown in FIG. 5 and FIG. 6.

The first reception unit 224 of the radio terminal 221 is receiving the control information broadcasted from the first radio base station by using radio, and judges whether the radio terminal 221 itself is located within a service area in which information from the second radio base station can be received or not, by utilizing the control information (step S11). This can be realized by including information indicating whether the second radio base station exists nearby or not in the control information broadcasted by the first radio base station, for example.

In the case where the radio terminal 221 is located within the service area, the location recognition unit 223 recognizes the location of the radio terminal 221 by utilizing a radio base station identifier or the like of the first radio base station that is contained in the control information. The reception control information memory unit 227 is storing identifiers of areas for receiving the push type distribution information such as identifiers of radio base stations or identifiers of areas defined to be formed by a plurality of radio base stations, and the reception control unit 228 judges whether or not to receive the push type distribution information by comparing this information stored in the reception control information memory unit 227 with the location information recognized by the location recognition unit 223 (step S12).

When the reception control unit 228 judges that the push type distribution information should be received, the second reception unit 222 receives the push type distribution information (step S13), or otherwise the second reception unit 222 does not receive the push type distribution information.

The above operation is carried out whenever the radio terminal 221 moves to another area, such that the push type distribution information is received according to the need.

On the other hand, when the user of the radio terminal 221 enters the user information into the user information memory unit 225 (step S21), the reception area determination unit 226 converts this user information into identifiers of radio base stations or identifiers of areas defined to be formed by a plurality of radio base stations that correspond to the areas for receiving the push type distribution information (step S22), and the reception control information memory unit 227 stores these identifiers (step S23). Note that this conversion may be carried out at the other timings such as regular timings, for example.

In this way, it becomes possible for the radio terminal 221 to select the nearby railway station of the home and the nearby railway station of the place of employment of the user and receive the push type distribution information such as the advertisement information for vicinities of these railway stations, for example.

Note that various methods can be used as a method of obtaining the base station identifiers or the like from the information regarding the user, similarly as in the third embodiment.

As described, the radio terminal of the fifth embodiment will receive the push type distribution information transmitted by the radio base station only within prescribed areas. In particular, the push type distribution information will be received according to addresses of the home and the place of employment, the schedule information, etc., of the user of the radio terminal. Consequently, it is possible to prevent the radio terminal from excessively frequently receiving the push type distribution information that is transmitted by the radio base station regardless of a request of the radio terminal, so that it is possible to prevent wasteful consumption of a battery power or a memory capacity of the radio terminal.

Also, in the case of providing the radio base station at a railway station, for example, the radio terminal owned by the user will receive the push type distribution information by selecting railways stations that are normally utilized by the user such as a nearby railway station of user's home, a nearby railway station of the user's place of employment and a nearby railway station of the user's school, or railway stations often utilized at a time of going out, while the radio terminal will not receive the push type distribution information at the other railway stations such as railway stations to be passed by the user in commuting between the home and the place of employment. Consequently, in the case of distributing the advertisement information or the like related to a vicinity of each railway station as the push type distribution information at each railway station, the advertisement information will be distributed only to those passengers who get on or off the trains at this railway station, so that the effective advertisement distribution becomes possible.

(Sixth Embodiment)

Next, with references to FIG. 5, FIG. 8 and FIG. 10, the sixth embodiment of the present invention will be described.

Figure 10:
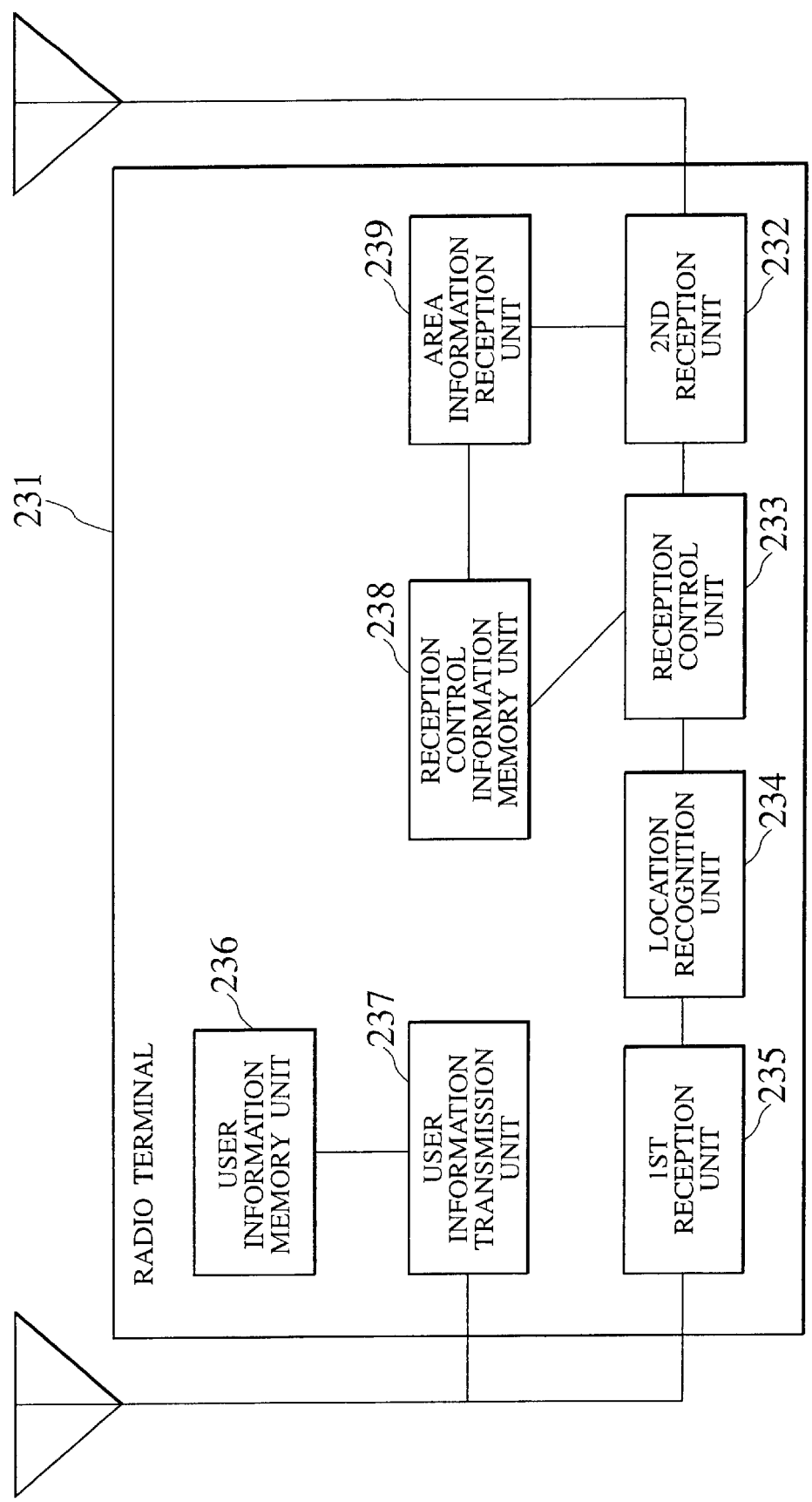
FIG. 10 is a block diagram showing an exemplary configuration of a radio terminal according to the sixth embodiment of the present invention.

FIG. 10 shows an exemplary configuration of the radio terminal according to the sixth embodiment, which is a radio terminal that receives push type distribution information only at areas where the reception of push type distribution information is useful for a user such as vicinities of a user's resident area and a user's place of employment, according to information regarding a user of the radio terminal. FIG. 5 and FIG. 8 show exemplary operations of the radio terminal of the sixth embodiment.

The sixth embodiment is a modification of the fourth embodiment, which is directed to the case where the control information is received by a radio communication system different from the radio base station that transmits the push type distribution information.

As shown in FIG. 10, the radio terminal 231 includes at least a first reception unit 235 for receiving control information transmitted by using radio from a first radio base station that is capable of transmitting information by using radio, a second reception unit 232 for receiving push type distribution information transmitted by using radio from a second radio base station that is capable of transmitting information faster than the first radio base station, to this radio terminal 231 according to a request from a device other than this radio terminal 231 (that is, without a request from this radio terminal 231), a location recognition unit 234 for recognizing a location of this radio terminal 231 itself by utilizing the control information received by the first reception unit 235, a user information memory unit 236 for storing information regarding the user of this radio terminal 231 such as addresses, postal codes, telephone numbers, etc., of the user's home, place of employment, school, etc., for example, a user information transmission unit 237 for transmitting the information stored in the user information memory unit 236 through a network, an area information reception unit 239 for receiving information regarding areas in which the radio terminal 231 receives the push type distribution information that is determined by a prescribed device in the network according to the information transmitted by the user information transmission unit 237, a reception control information memory unit 238 for storing the information regarding the areas received by the area information reception unit 239, and a reception control unit 233 for controlling the second reception unit 232 by judging whether or not to receive the push type distribution information transmitted from the second radio base station according to the location recognized by the location recognition unit 234 and the information stored in the reception control information memory unit 238.

Exemplary operations of the radio terminal 231 of FIG. 10 will now be described along flow charts shown in FIG. 5 and FIG. 8.

The first reception unit 235 of the radio terminal 231 is receiving the control information broadcasted from the first radio base station by using radio, and judges whether the radio terminal 231 itself is located within a service area in which information from the second radio base station can be received or not, by utilizing the control information (step S11). This can be realized by including information indicating whether the second radio base station exists nearby or not in the control information broadcasted by the first radio base station, for example.

In the case where the radio terminal 231 is located within the service area, the location recognition unit 234 recognizes the location of the radio terminal 231 by utilizing a radio base station identifier or the like of the first radio base station that is contained in the control information. The reception control information memory unit 238 is storing identifiers of areas for receiving the push type distribution information such as identifiers of radio base stations or identifiers of areas defined to be formed by a plurality of radio base stations, and the reception control unit 233 judges whether or not to receive the push type distribution information by comparing this information stored in the reception control information memory unit 238 with the location information recognized by the location recognition unit 234 (step S12).

When the reception control unit 233 judges that the push type distribution information should be received, the second reception unit 232 receives the push type distribution information (step S13), or otherwise the second reception unit 232 does not receive the push type distribution information.

The above operation is carried out whenever the radio terminal 231 moves to another area, such that the push type distribution information is received according to the need.

On the other hand, when the user of the radio terminal 231 enters the user information into the user information memory unit 236 (step S31), the user information transmission unit 237 transmits this user information to the prescribed device in the network (step S32). Here, the user information can be addresses, postal codes, telephone numbers, etc., of the user's home, place of employment, school, etc., for example. Note that this user information transmission may be carried out at the other timings such as regular timings, for example.

Upon receiving the user information, the prescribed device in the network converts this user information into identifiers of radio base stations or identifiers of areas defined to be formed by a plurality of radio base stations that correspond to the areas in which the radio terminal 231 receives the push type distribution information, and transmits them to the radio terminal 231.

At the radio terminal 231, this information is received by the area information reception unit 239 through the second reception unit 232 (step S33), and the reception control information memory unit 238 stores these identifiers (step S34).

By this operation, when the user enters the home and the place of employment, the prescribed device in the network obtains identifiers of their nearby radio base stations, and the radio terminal 231 receives and stores these identifiers.

In this way, it becomes possible for the radio terminal 231 to select the nearby railway station of the home and the nearby railway station of the place of employment of the user and receive the push type distribution information such as the advertisement information for vicinities of these railway stations, for example.

Note that various methods can be used as a method of obtaining the base station identifiers or the like from the information regarding the user, similarly as in the third embodiment.

Note also that, in the radio terminal 231 described above, the information of the identifiers or the like is received through the second reception unit 232, but it is also receive this information through the first reception unit 235.

As described, the radio terminal of the sixth embodiment will receive the push type distribution information transmitted by the radio base station only within prescribed areas. In particular, the push type distribution information will be received according to addresses of the home and the place of employment, the schedule information, etc., of the user of the radio terminal. Consequently, it is possible to prevent the radio terminal from excessively frequently receiving the push type distribution information that is transmitted by the radio base station regardless of a request of the radio terminal, so that it is possible to prevent wasteful consumption of a battery power or a memory capacity of the radio terminal.

Also, in the case of providing the radio base station at a railway station, for example, the radio terminal owned by the user will receive the push type distribution information by selecting railways stations that are normally utilized by the user such as a nearby railway station of user's home, a nearby railway station of the user's place of employment and a nearby railway station of the user's school, or railway stations often utilized at a time of going out, while the radio terminal will not receive the push type distribution information at the other railway stations such as railway stations to be passed by the user in commuting between the home and the place of employment. Consequently, in the case of distributing the advertisement information or the like related to a vicinity of each railway station as the push type distribution information at each railway station, the advertisement information will be distributed only to those passengers who get on or off the trains at this railway station, so that the effective advertisement distribution becomes possible.

(Seventh Embodiment)

Next, with references to FIG. 5 and FIG. 11 to FIG. 13, the seventh embodiment of the present invention will be described.

Figure 11:
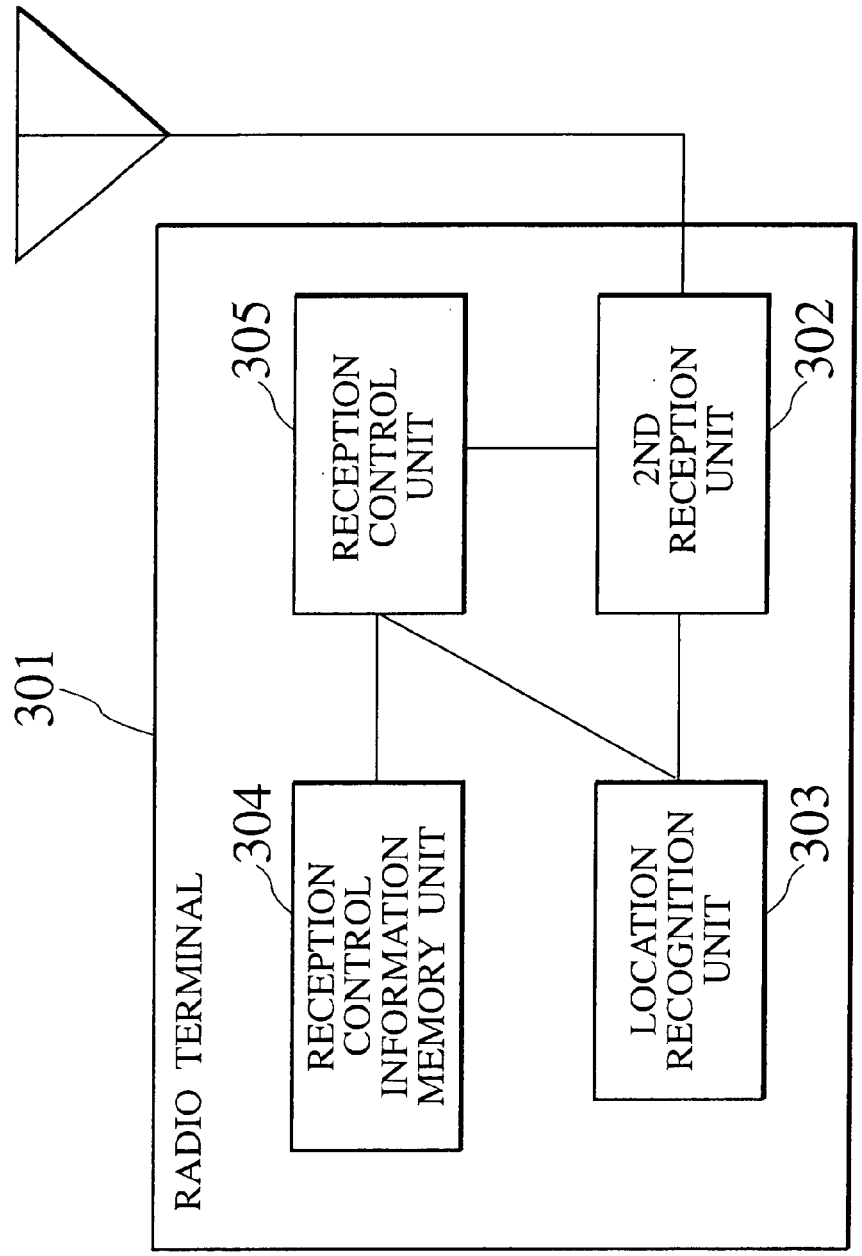
FIG. 11 is a block diagram showing an exemplary configuration of a radio terminal according to the seventh embodiment of the present invention.
Figure 12:
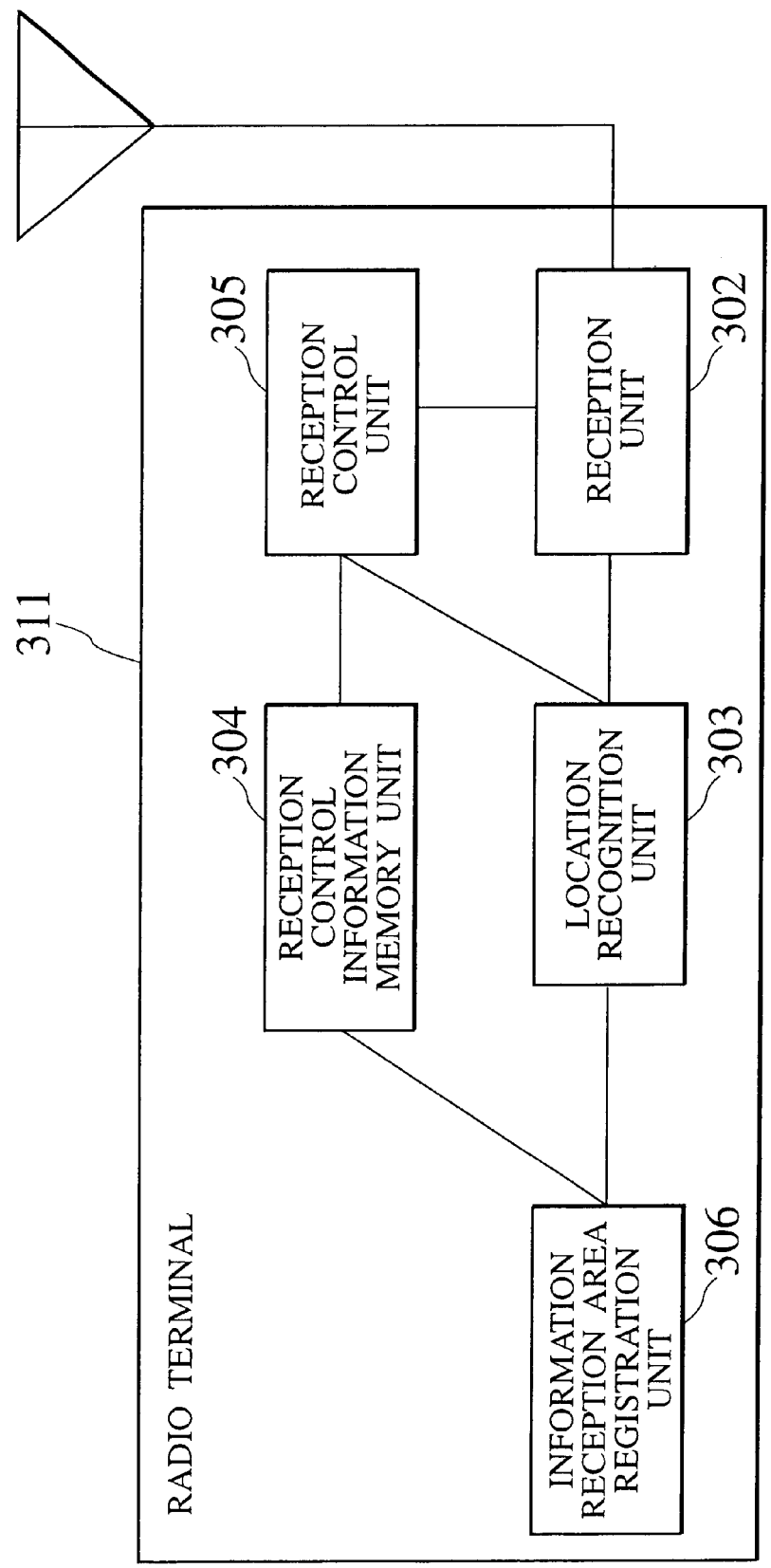
FIG. 12 is a block diagram showing another exemplary configuration of a radio terminal according to the seventh embodiment of the present invention.
Figure 13:
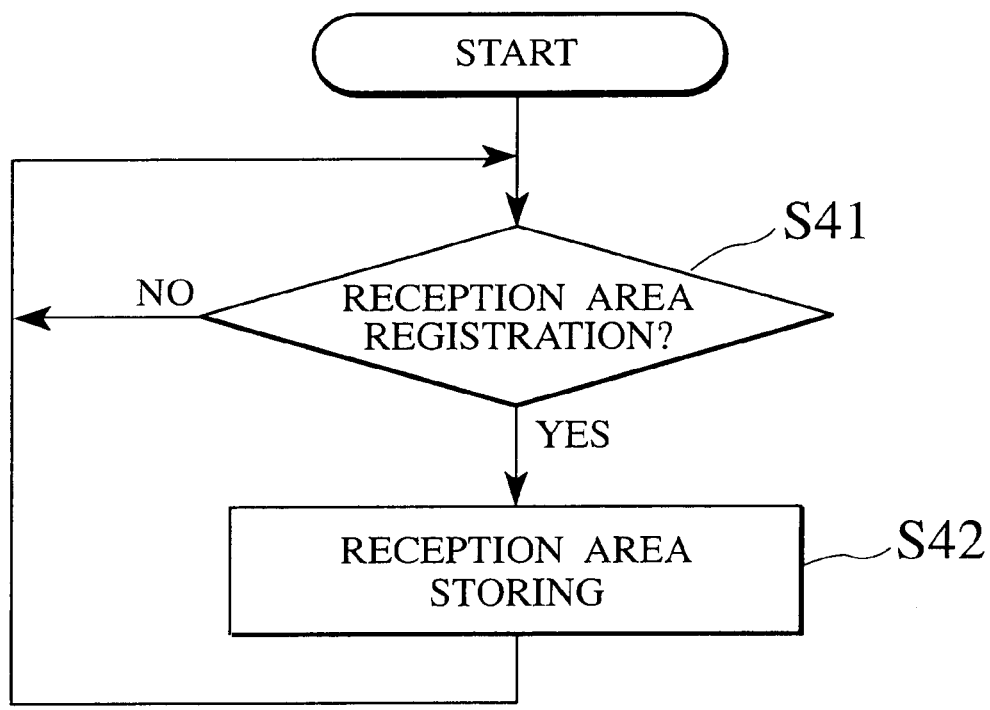
FIG. 13 is a flow chart showing an exemplary operation of a radio terminal according to the seventh and eighth embodiments of the present invention.

FIG. 11 and FIG. 12 show exemplary configurations of the radio terminal according to the seventh embodiment, each of which is a radio terminal that stores areas for receiving push type distribution information, and receives push type distribution information only at areas where the reception of push type distribution information is useful for a user such as vicinities of a user's resident area and a user's place of employment. FIG. 5 and FIG. 13 show exemplary operations of the radio terminal of the seventh embodiment.

As shown in FIG. 11, the radio terminal 301 includes at least a reception unit 302 for receiving control information transmitted from a radio base station by using radio and push type distribution information transmitted from that radio base station by using radio to this radio terminal 301 according to a request from a device other than this radio terminal 301 (that is, without a request from this radio terminal 301), a location recognition unit 303 for recognizing a location of this radio terminal 301 itself by utilizing the control information received by the reception unit 302, a reception control information memory unit 304 for storing information regarding areas for receiving the push type distribution information, and a reception control unit 305 for controlling the reception unit 302 by judging whether or not to receive the push type distribution information transmitted from the radio base station according to the location recognized by the location recognition unit 303 and the information stored in the reception control information memory unit 304.

An exemplary operation of the radio terminal 301 of FIG. 11 will now be described along a flow chart shown in FIG. 5.

The reception unit 302 of the radio terminal 301 is receiving the control information broadcasted from the radio base station by using radio, and judges whether the radio terminal 301 itself is located within a service area or not according to whether the control information can be received or not (step S11).

In the case where the radio terminal 301 is located within the service area, the location recognition unit 303 recognizes the location of the radio terminal 301 by utilizing a radio base station identifier or the like that is contained in the control information. The reception control information memory unit 304 is storing identifiers of areas for receiving the push type distribution information such as identifiers of radio base stations or identifiers of areas defined to be formed by a plurality of radio base stations, and the reception control unit 305 judges whether or not to receive the push type distribution information by comparing this information stored in the reception control information memory unit 304 with the location information recognized by the location recognition unit 303 (step S12).

When the reception control unit 305 judges that the push type distribution information should be received, the reception unit 302 receives the push type distribution information (step S13), or otherwise the reception unit 302 does not receive the push type distribution information.

For example, in the case of judging this according to the radio base station identifier, the reception control unit 305 checks whether the radio base station identifier recognized by the location recognition unit 303 is stored in the reception control information memory unit 304 or not, and controls the reception unit 302 to receive the push type distribution information when that radio base station identifier is stored in the reception control information memory unit 304.

The above operation is carried out whenever the radio terminal 301 moves to another area, such that the push type distribution information is received according to the need.

On the other hand, the radio terminal 311 shown in FIG. 12 operates similarly as the radio terminal 301 of FIG. 11, but in addition it also includes an information reception area registration unit 306 such that the user can register the areas for receiving the push type distribution information. In this case, as shown in FIG. 13, the user registers areas in which the reception of the push type distribution information is desired (step S41), and the reception control information memory unit 304 of the radio terminal 311 stores the registered areas (step S42).

For example, the user who is carrying around the radio terminal 311 will carry out a prescribed operation such as pressing a specific button with respect to the radio terminal 311 when the user wishes to receive the push type distribution information at that location. The location recognition unit 303 is recognizing the location according to the radio base station identifier or the like received through the reception unit 302, so that when the user carries out such an operation, the reception control information memory unit 304 stores the location information recognized at that moment, such as the radio base station identifier, for example. The reception control information memory unit 304 may retain this information after it is stored once until the user carries out an operation for deleting the registration, or delete this information after a prescribed period of time has elapsed after the registration.

As an alternative registration method, the radio terminal 311 can be provided with a list of areas at which the push type distribution information is distributed, such that the user selects areas at which the reception of the push type distribution information is desired from that area list, and registers the selected areas. It is obviously also possible to enable the deletion of the registered areas.

It is also possible to enable the operations on the registered contents in the reception control information memory unit 304 of the radio terminal 301 or 311 from an external PC or the like. For example, a route map of the train can be displayed on a screen of the external PC such that the user can select desired railway stations on the route map. Then, the radio base station identifiers or the like corresponding to the selected railway stations can be transferred from the PC to the radio terminal 301 or 311 and registered into the reception control information memory unit 304. Also, the railway stations related to a keyword entered by the user at the PC can be displayed on the route map, and the radio base station identifiers or the like of these railway stations can be transferred from the PC to the radio terminal 301 or 311 and registered into the reception control information memory unit 304 according to a command of the user. Also, the contents currently set in the reception control information memory unit 304 of the radio terminal 301 or 311 can be displayed on the route map. Besides these, it is also possible to realize a variety of graphical user interfaces.

The above points also apply to the eighth to tenth embodiments to be described below.

Note that the reception control information can be stored into the reception control information memory unit 304, by transferring the reception control information from the external PC or the like to the radio terminal 301 or 311, or by providing a user interface for registration/deletion of the reception control information on the radio terminal 301 or 311.

By the above operation, in the case where the radio base station is provided at a railway station, for example, the reception of the push type distribution information at the nearby railway stations of the home and the place of employment that are normally utilized by the user can be registered, such that it becomes possible for the radio terminal to receive the push type distribution information at desired railway stations without requiring the user to operate the radio terminal. In particular, in the case of transmitting advertisement information for a vicinity of the railway station or information specific to the region as the push type distribution information at the radio base station of each railway station, it becomes possible for the radio terminal of the user to receive such information according to the desire of the user.

As described, the radio terminal of the seventh embodiment will receive the push type distribution information transmitted by the radio base station only within prescribed areas. In particular, the push type distribution information will be received according to the desire of the user of the radio terminal. Also, it becomes possible for the user of the radio terminal to register areas in which the reception of the push type distribution information is desired into the radio terminal easily. Consequently, it is possible to prevent the radio terminal from excessively frequently receiving the push type distribution information that is transmitted by the radio base station regardless of a request of the radio terminal, so that it is possible to prevent wasteful consumption of a battery power or a memory capacity of the radio terminal.

Also, in the case of providing the radio base station at a railway station, for example, the radio terminal owned by the user will receive the push type distribution information by selecting railways stations that are normally utilized by the user such as a nearby railway station of user's home, a nearby railway station of the user's place of employment and a nearby railway station of the user's school, or railway stations often utilized at a time of going out, while the radio terminal will not receive the push type distribution information at the other railway stations such as railway stations to be passed by the user in commuting between the home and the place of employment. Consequently, in the case of distributing the advertisement information or the like related to a vicinity of each railway station as the push type distribution information at each railway station, the advertisement information will be distributed only to those passengers who get on or off the trains at this railway station, so that the effective advertisement distribution becomes possible.

(Eighth Embodiment)

Next, with references to FIG. 5 and FIG. 13 to FIG. 15, the eighth embodiment of the present invention will be described.

Figure 14:
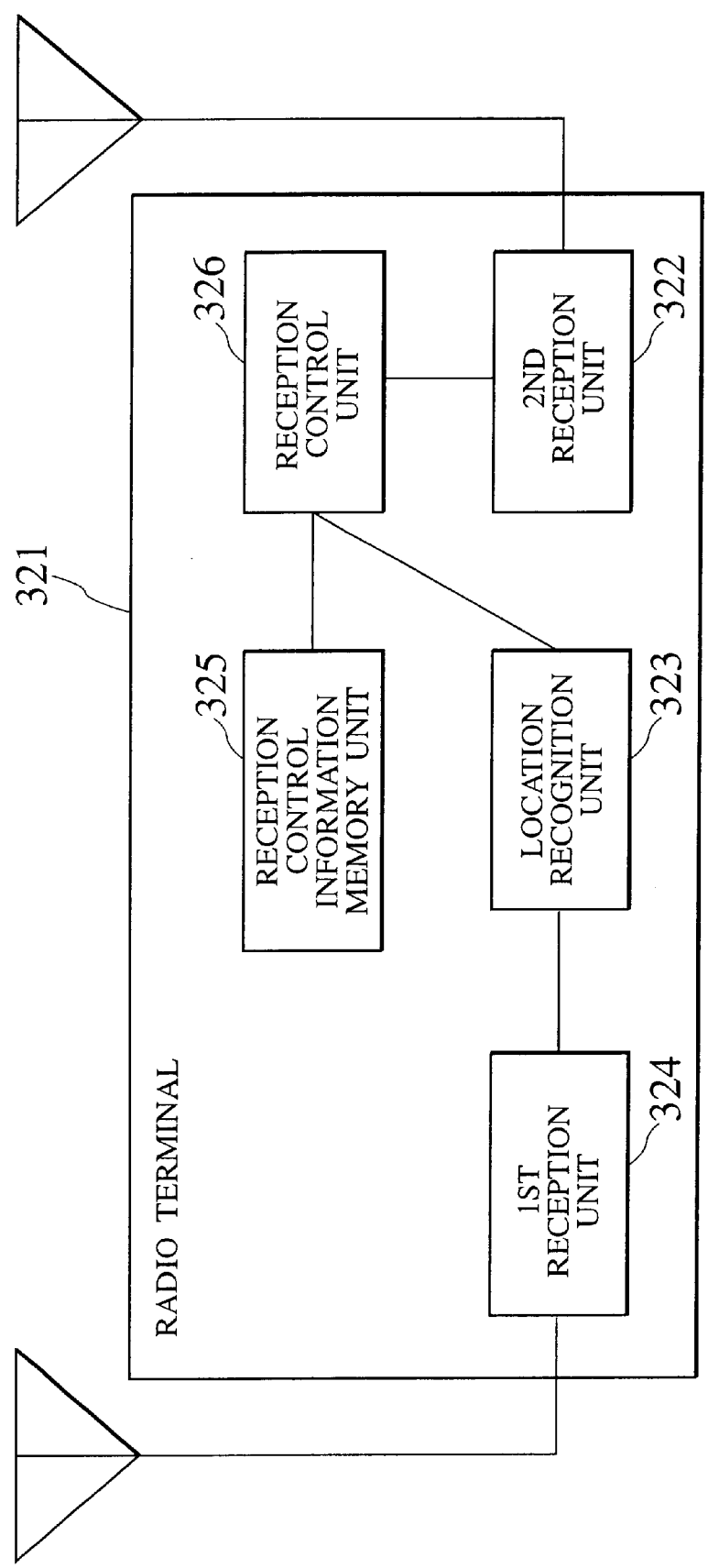
FIG. 14 is a block diagram showing an exemplary configuration of a radio terminal according to the eighth embodiment of the present invention.
Figure 15:
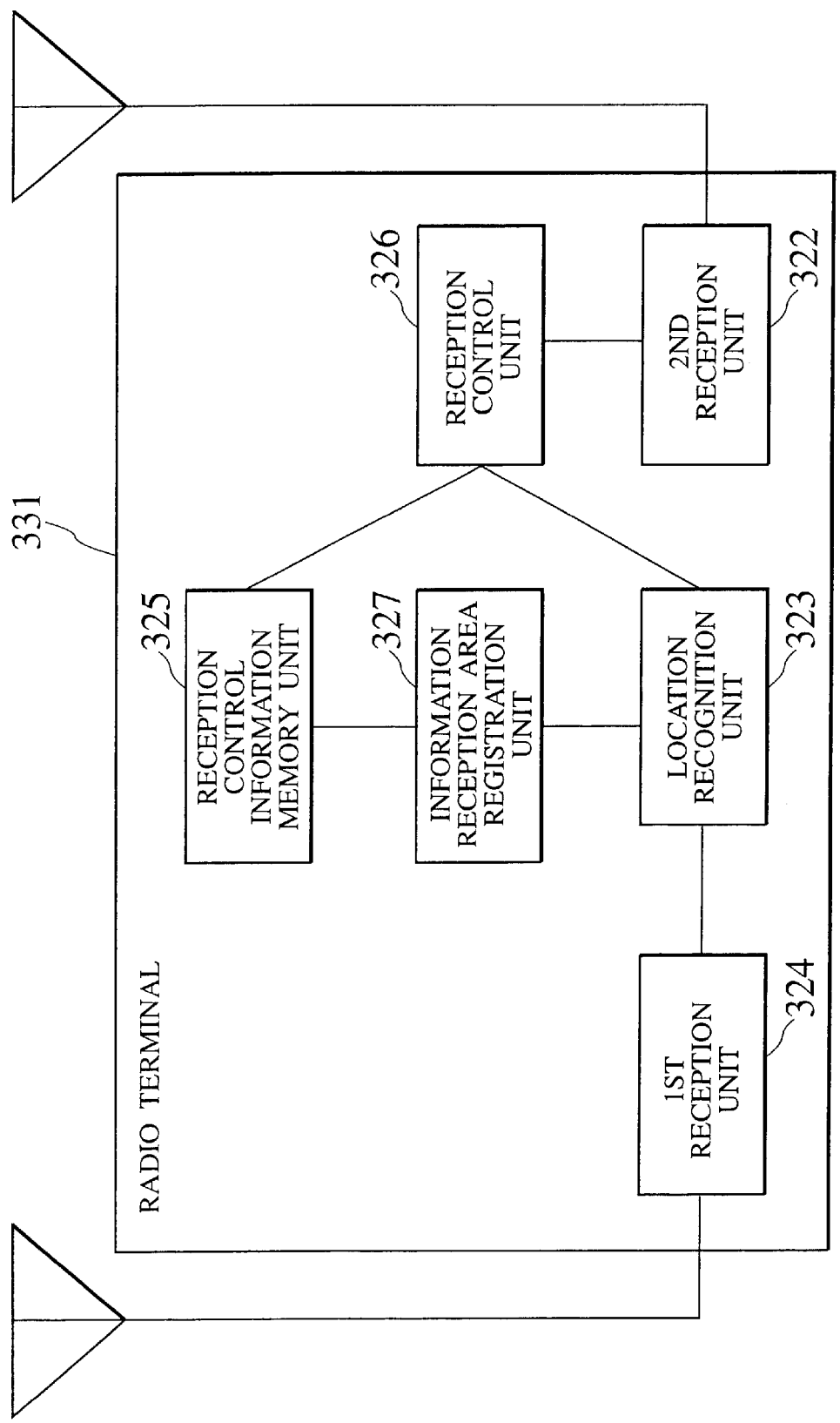
FIG. 15 is a block diagram showing another exemplary configuration of a radio terminal according to the eighth embodiment of the present invention.

FIG. 14 and FIG. 15 show exemplary configurations of the radio terminal according to the eighth embodiment, each of which is a radio terminal that stores areas for receiving push type distribution information, and receives push type distribution information only at areas where the reception of push type distribution information is useful for a user such as vicinities of a user's resident area and a user's place of employment. FIG. 5 and FIG. 13 show exemplary operations of the radio terminal of the eighth embodiment.

The eighth embodiment is a modification of the seventh embodiment, which is directed to the case where the control information is received by a radio communication system different from the radio base station that transmits the push type distribution information.

As shown in FIG. 14, the radio terminal 321 includes at least a first reception unit 324 for receiving control information transmitted by using radio from a first radio base station that is capable of transmitting information by using radio, a second reception unit 322 for receiving push type distribution information transmitted by using radio from a second radio base station that is capable of transmitting information faster than the first radio base station, to this radio terminal 321 according to a request from a device other than this radio terminal 321 (that is, without a request from this radio terminal 321), a location recognition unit 323 for recognizing a location of this radio terminal 321 itself by utilizing the control information received by the first reception unit 324, a reception control information memory unit 325 for storing information regarding areas for receiving the push type distribution information, and a reception control unit 326 for controlling the second reception unit 322 by judging whether or not to receive the push type distribution information transmitted from the second radio base station according to the location recognized by the location recognition unit 323 and the information stored in the reception control information memory unit 325.

An exemplary operation of the radio terminal 321 of FIG. 14 will now be described along a flow chart shown in FIG. 5.

The first reception unit 324 of the radio terminal 321 is receiving the control information broadcasted from the first radio base station by using radio, and judges whether the radio terminal 321 itself is located within a service area in which information from the second radio base station can be received or not, by utilizing the control information (step S11). This can be realized by including information indicating whether the second radio bast station exists nearby or not in the control information broadcasted by the first radio base station, for example.

In the case where the radio terminal 321 is located within the service area, the location recognition unit 323 recognizes the location of the radio terminal 321 by utilizing a radio base station identifier or the like of the first radio base station that is contained in the control information. Here, the location may be recognized by utilizing the radio base station identifier of the second radio base station. The reception control information memory unit 325 is storing identifiers of areas for receiving the push type distribution information such as identifiers of the first radio base stations or identifiers of areas defined to be formed by a plurality of the first radio base stations, and the reception control unit 326 judges whether or not to receive the push type distribution information by comparing this information stored in the reception control information memory unit 325 with the location information recognized by the location recognition unit 323 (step S12). Note that the information stored in the reception control information memory unit 325 may be identifiers of the second radio base stations or identifiers of areas defined to be formed by a plurality of the second radio base stations.

When the reception control unit 326 judges that the push type distribution information should be received, the second reception unit 322 receives the push type distribution information (step S13), or otherwise the second reception unit 322 does not receive the push type distribution information.

For example, in the case of judging this according to the radio base station identifier of the first radio base station, the reception control unit 326 checks whether the radio base station identifier of the first radio base station recognized by the location recognition unit 323 is stored in the reception control information memory unit 325 or not, and controls the second reception unit 322 to receive the push type distribution information when that radio base station identifier is stored in the reception control information memory unit 325.

The above operation is carried out whenever the radio terminal 321 moves to another area, such that the push type distribution information is received according to the need.

On the other hand, the radio terminal 331 shown in FIG. 15 operates similarly as the radio terminal 321 of FIG. 14, but in addition it also includes an information reception area registration unit 327 such that the user can register the areas for receiving the push type distribution information. In this case, as shown in FIG. 13, the user registers areas in which the reception of the push type distribution information is desired (step S41), and the reception control information memory unit 325 of the radio terminal 331 stores the registered areas (step S42).

For example, the user who is carrying around the radio terminal 331 will carry out a prescribed operation such as pressing a specific button with respect to the radio terminal 331 when the user wishes to receive the push type distribution information at that location. The location recognition unit 323 is recognizing the location according to the radio base station identifier or the like received through the first reception unit 324, so that when the user carries out such an operation, the reception control information memory unit 325 stores the location information recognized at that moment, such as the radio base station identifier, for example. The reception control information memory unit 325 may retain this information after it is stored once until the user carries out an operation for deleting the registration, or delete this information after a prescribed period of time has elapsed after the registration.

As an alternative registration method, the radio terminal 331 can be provided with a list of areas at which the push type distribution information is distributed, such that the user selects areas at which the reception of the push type distribution information is desired from that area list, and registers the selected areas.

Similarly as described for the seventh embodiment, it is also possible to enable the operations of the radio terminal 321 or 331 from an external PC or the like.

By the above operation, in the case where the radio base station is provided at a railway station, for example, the reception of the push type distribution information at the nearby railway stations of the home and the place of employment that are normally utilized by the user can be registered, such that it becomes possible for the radio terminal to receive the push type distribution information at desired railway stations without requiring the user to operate the radio terminal. In particular, in the case of transmitting advertisement information for a vicinity of the railway station or information specific to the region as the push type distribution information at the radio base station of each railway station, it becomes possible for the radio terminal of the user to receive such information according to the desire of the user.

As described, the radio terminal of the eighth embodiment will receive the push type distribution information transmitted by the radio base station only within prescribed areas. In particular, the push type distribution information will be received according to the desire of the user of the radio terminal. Also, it becomes possible for the user of the radio terminal to register areas in which the reception of the push type distribution information is desired into the radio terminal easily. Consequently, it is possible to prevent the radio terminal from excessively frequently receiving the push type distribution information that is transmitted by the radio base station regardless of a request of the radio terminal, so that it is possible to prevent wasteful consumption of a battery power or a memory capacity of the radio terminal.

Also, in the case of providing the radio base station at a railway station, for example, the radio terminal owned by the user will receive the push type distribution information by selecting railways stations that are normally utilized by the user such as a nearby railway station of user's home, a nearby railway station of the user's place of employment and a nearby railway station of the user's school, or railway stations often utilized at a time of going out, while the radio terminal will not receive the push type distribution information at the other railway stations such as railway stations to be passed by the user in commuting between the home and the place of employment. Consequently, in the case of distributing the advertisement information or the like related to a vicinity of each railway station as the push type distribution information at each railway station, the advertisement information will be distributed only to those passengers who get on or off the trains at this railway station, so that the effective advertisement distribution becomes possible.

(Ninth Embodiment)

Next, with references to FIG. 16 to FIG. 19, the ninth embodiment of the present invention will be described.

Figure 16:
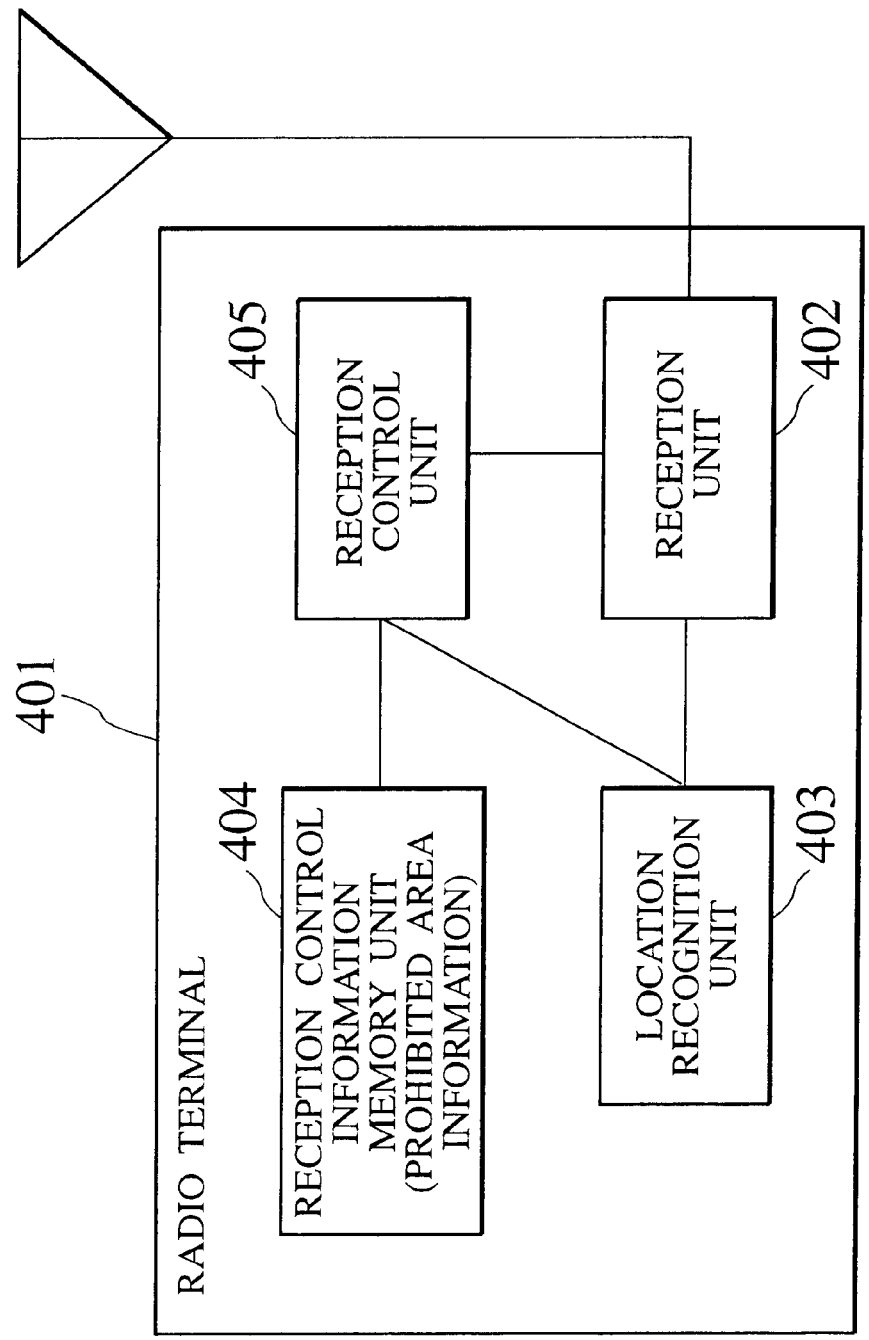
FIG. 16 is a block diagram showing an exemplary configuration of a radio terminal according to the ninth embodiment of the present invention.
Figure 17:
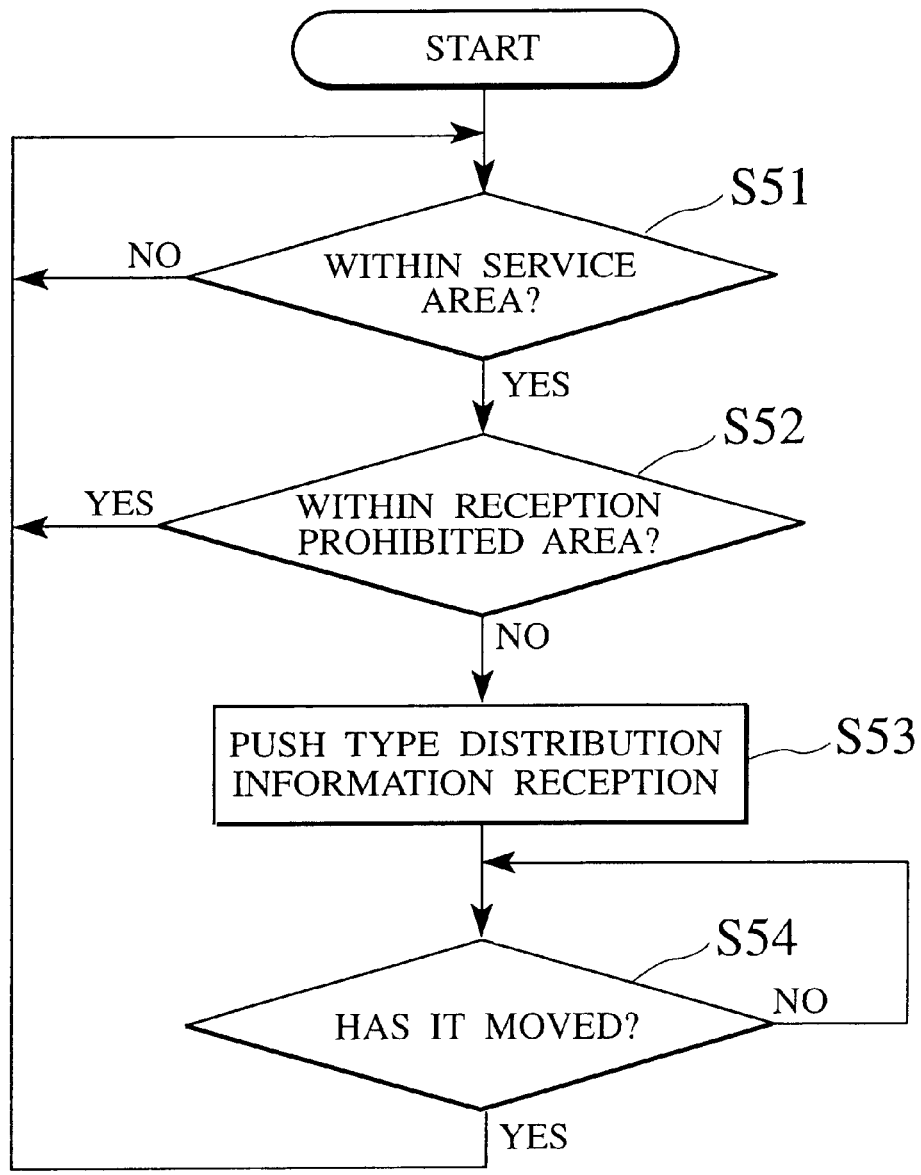
FIG. 17 is a flow chart showing an exemplary operation of a radio terminal according to the ninth and tenth embodiments of the present invention.
Figure 18:
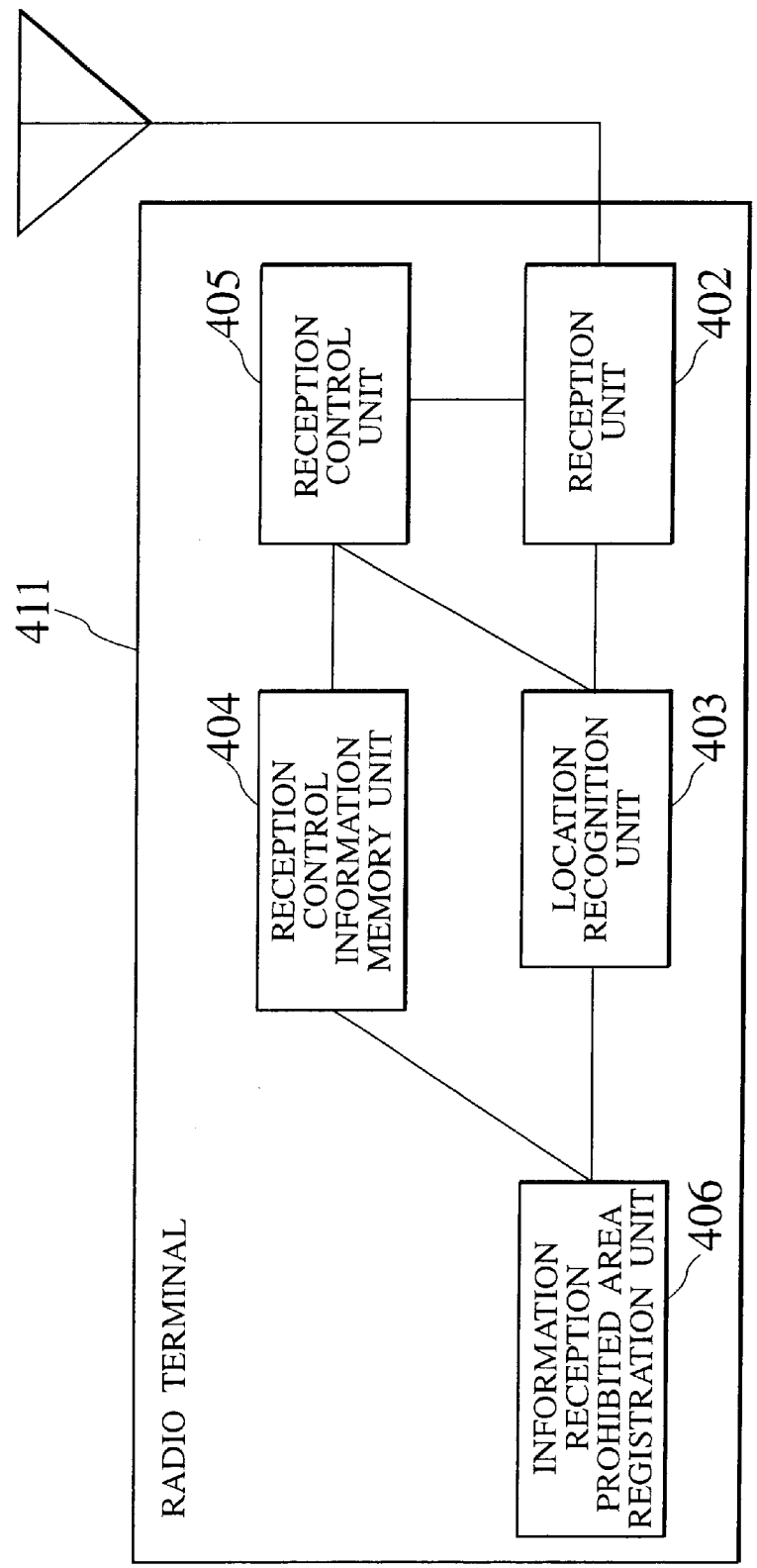
FIG. 18 is a block diagram showing another exemplary configuration of a radio terminal according to the ninth embodiment of the present invention.
Figure 19:
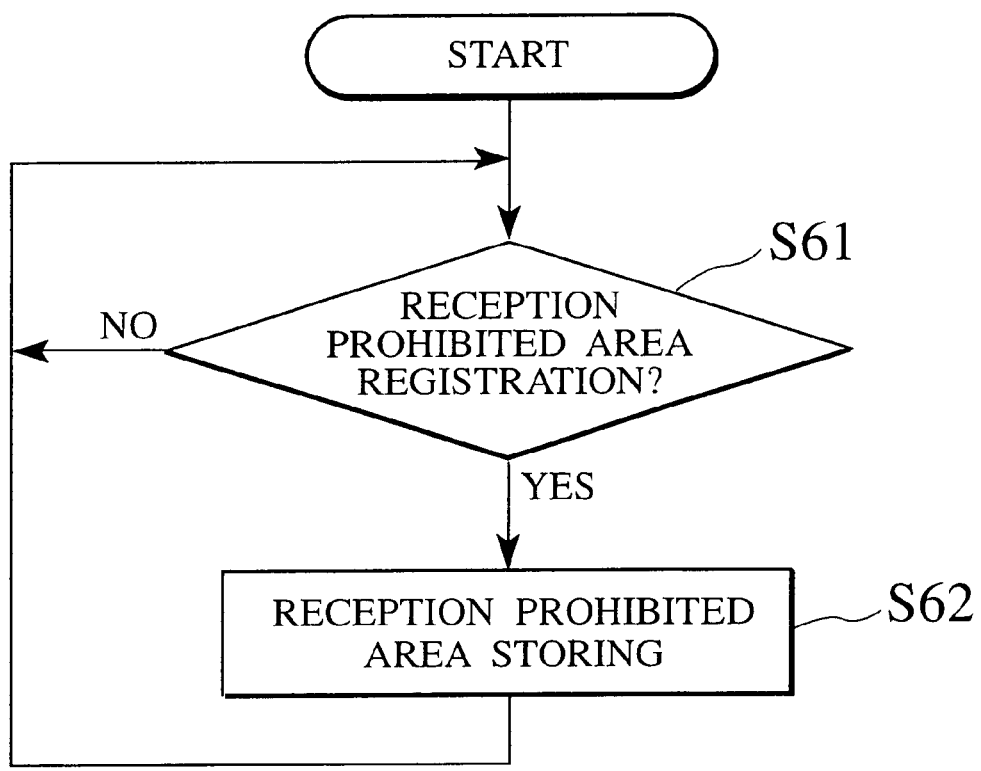
FIG. 19 is a flow chart showing another exemplary operation of a radio terminal according to the ninth and tenth embodiments of the present invention.

FIG. 16 and FIG. 18 show exemplary configurations of the radio terminal according to the ninth embodiment, each of which is a radio terminal that stores areas for prohibiting reception of push type distribution information, and receives push type distribution information only at areas where the user desires the reception of push type distribution information such as vicinities of a user's resident area and a user's place of employment. FIG. 17 and FIG. 19 show exemplary operations of the radio terminal of the ninth embodiment.

As shown in FIG. 16, the radio terminal 401 includes at least a reception unit 402 for receiving control information transmitted from a radio base station by using radio and push type distribution information transmitted from that radio base station by using radio to this radio terminal 401 according to a request from a device other than this radio terminal 401 (that is, without a request from this radio terminal 401), a location recognition unit 403 for recognizing a location of this radio terminal 401 itself by utilizing the control information received by the reception unit 402, a reception control information memory unit 404 for storing information regarding areas for prohibiting reception of the push type distribution information, and a reception control unit 405 for controlling the reception unit 402 by judging whether or not to receive the push type distribution information transmitted from the radio base station according to the location recognized by the location recognition unit 403 and the information stored in the reception control information memory unit 404.

An exemplary operation of the radio terminal 401 of FIG. 16 will now be described along a flow chart shown in FIG. 17.

The reception unit 402 of the radio terminal 401 is receiving the control information broadcasted from the radio base station by using radio, and judges whether the radio terminal 401 itself is located within a service area or not according to whether the control information can be received or not (step S51).

In the case where the radio terminal 401 is located within the service area, the location recognition unit 403 recognizes the location of the radio terminal 401 by utilizing a radio base station identifier or the like that is contained in the control information. The reception control information memory unit 404 is storing identifiers of areas for prohibiting reception of the push type distribution information such as identifiers of radio base stations or identifiers of areas defined to be formed by a plurality of radio base stations, and the reception control unit 405 judges whether or not to receive the push type distribution information by comparing this information stored in the reception control information memory unit 404 with the location information recognized by the location recognition unit 403 (step S52).

When the reception control unit 405 judges that the push type distribution information should be received, the reception unit 402 receives the push type distribution information (step S53), or otherwise the reception unit 402 does not receive the push type distribution information.

For example, in the case of judging this according to the radio base station identifier, the reception control unit 405 checks whether the radio base station identifier recognized by the location recognition unit 403 is stored in the reception control information memory unit 404 or not, and controls the reception unit 402 to receive the push type distribution information when that radio base station identifier is not stored in the reception control information memory unit 404.

The above operation is carried out whenever the radio terminal 401 moves to another area, such that the push type distribution information is received according to the need.

On the other hand, the radio terminal 411 shown in FIG. 18 operates similarly as the radio terminal 401 of FIG. 16, but in addition it also includes an information reception prohibited area registration unit 406 such that the user can register the areas for prohibiting reception of the push type distribution information. In this case, as shown in FIG. 19, the user registers areas in which the prohibition of reception of the push type distribution information is desired (step S61), and the reception control information memory unit 404 of the radio terminal 411 stores the registered areas (step S62).

For example, the user who is carrying around the radio terminal 411 will carry out a prescribed operation such as pressing a specific button with respect to the radio terminal 411 when the user wishes to prohibit reception of the push type distribution information at that location. The location recognition unit 403 is recognizing the location according to the radio base station identifier or the like received through the reception unit 402, so that when the user carries out such an operation, the reception control information memory unit 404 stores the location information recognized at that moment, such as the radio base station identifier, for example. The reception control information memory unit 404 may retain this information after it is stored once until the user carries out an operation for deleting the registration, or delete this information after a prescribed period of time has elapsed after the registration.

As an alternative registration method, the radio terminal 411 can be provided with a list of areas at which the push type distribution information is distributed, such that the user selects areas at which the prohibition of reception of the push type distribution information is desired from that area list, and registers the selected areas.

Similarly as described for the seventh embodiment, it is also possible to enable the operations of the radio terminal 401 or 411 from an external PC or the like.

By the above operation, in the case where the radio base station is provided at a railway station, for example, the prohibition of reception of the push type distribution information at the railway stations to be passed in commuting between the home and the place of employment that are normally not utilized by the user can be registered, such that it becomes possible to prevent the radio terminal from receiving the push type distribution information at those railway stations where reception of the push type distribution information is not desired. In particular, in the case of transmitting advertisement information for a vicinity of the railway station or information specific to the region as the push type distribution information at the radio base station of each railway station, it becomes possible to prevent the radio terminal of the user from receiving such information at railway stations other than those normally utilized by the user, according to the desire of the user.

As described, the radio terminal of the ninth embodiment will receive the push type distribution information transmitted by the radio base station only within prescribed areas. In particular, the push type distribution information will be received according to the desire of the user of the radio terminal. Also, it becomes possible for the user of the radio terminal to register areas in which the prohibition of reception of the push type distribution information is desired into the radio terminal easily. Consequently, it is possible to prevent the radio terminal from excessively frequently receiving the push type distribution information that is transmitted by the radio base station regardless of a request of the radio terminal, so that it is possible to prevent wasteful consumption of a battery power or a memory capacity of the radio terminal.

Also, in the case of providing the radio base station at a railway station, for example, the radio terminal owned by the user will receive the push type distribution information by selecting railways stations that are normally utilized by the user such as a nearby railway station of user's home, a nearby railway station of the user's place of employment and a nearby railway station of the user's school, or railway stations often utilized at a time of going out, while the radio terminal will not receive the push type distribution information at the other railway stations such as railway stations to be passed by the user in commuting between the home and the place of employment. Consequently, in the case of distributing the advertisement information or the like related to a vicinity of each railway station as the push type distribution information at each railway station, the advertisement information will be distributed only to those passengers who get on or off the trains at this railway station, so that the effective advertisement distribution becomes possible.

(Tenth Embodiment)

Next, with references to FIG. 17 and FIG. 19 to FIG. 21, the tenth embodiment of the present invention will be described.

Figure 20:
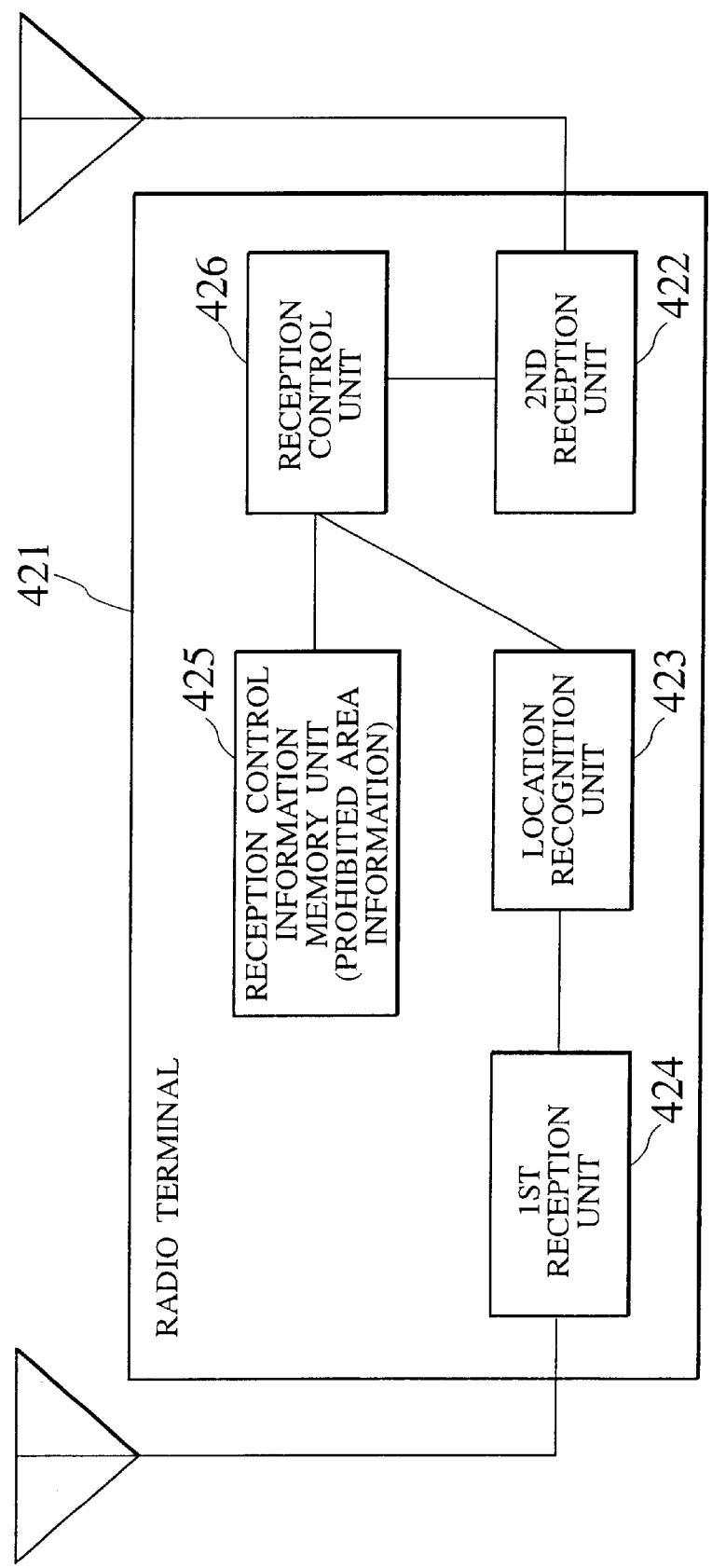
FIG. 20 is a block diagram showing an exemplary configuration of a radio terminal according to the tenth embodiment of the present invention.
Figure 21:
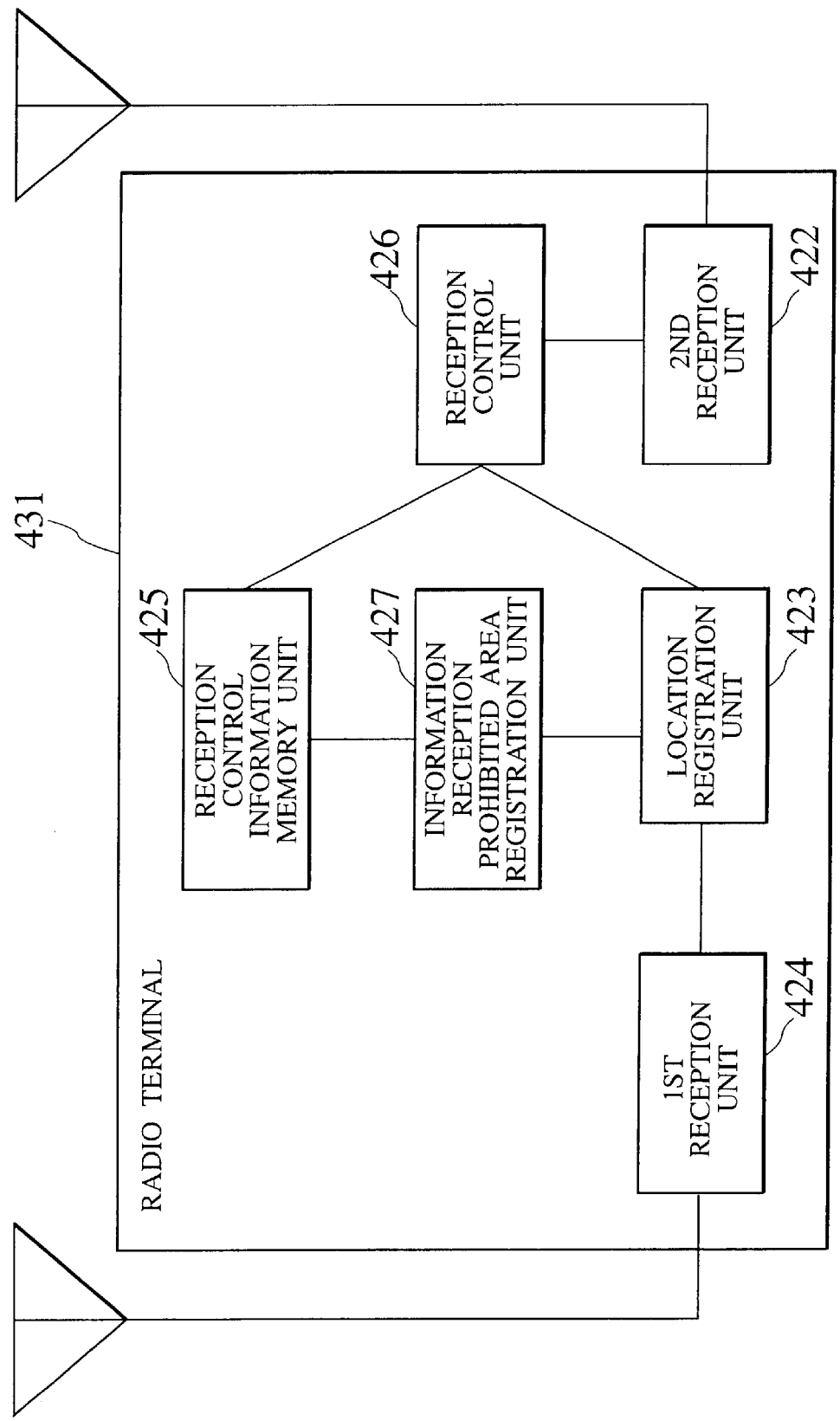
FIG. 21 is a block diagram showing another exemplary configuration of a radio terminal according to the tenth embodiment of the present invention.

FIG. 20 and FIG. 21 show exemplary configurations of the radio terminal according to the tenth embodiment, each of which is a radio terminal that stores areas for prohibiting reception of push type distribution information, and receives push type distribution information only at areas where the user desires the reception of push type distribution information such as vicinities of a user's resident area and a user's place of employment. FIG. 17 and FIG. 19 show exemplary operations of the radio terminal of the tenth embodiment.

The tenth embodiment is a modification of the ninth embodiment, which is directed to the case where the control information is received by a radio communication system different from the radio base station that transmits the push type distribution information.

As shown in FIG. 20, the radio terminal 421 includes at least a first reception unit 424 for receiving control information transmitted by using radio from a first radio base station that is capable of transmitting information by using radio, a second reception unit 422 for receiving push type distribution information transmitted by using radio from a second radio base station that is capable of transmitting information faster than the first radio base station, to this radio terminal 421 according to a request from a device other than this radio terminal 421 (that is, without a request from this radio terminal 421), a location recognition unit 423 for recognizing a location of this radio terminal 421 itself by utilizing the control information received by the first reception unit 424, a reception control information memory unit 425 for storing information regarding areas for prohibiting reception of the push type distribution information, and a reception control unit 426 for controlling the second reception unit 422 by judging whether or not to receive the push type distribution information transmitted from the second radio base station according to the location recognized by the location recognition unit 423 and the information stored in the reception control information memory unit 425.

An exemplary operation of the radio terminal 421 of FIG. 20 will now be described along a flow chart shown in FIG. 17.

The first reception unit 424 of the radio terminal 421 is receiving the control information broadcasted from the first radio base station by using radio, and judges whether the radio terminal 421 itself is located within a service area in which information from the second radio base station can be received or not, by utilizing the control information (step S51). This can be realized by including information indicating whether the second radio bast station exists nearby or not in the control information broadcasted by the first radio base station, for example.

In the case where the radio terminal 421 is located within the service area, the location recognition unit 423 recognizes the location of the radio terminal 421 by utilizing a radio base station identifier or the like of the first radio base station that is contained in the control information. Here, the location may be recognized by utilizing the radio base station identifier of the second radio base station. The reception control information memory unit 425 is storing identifiers of areas for prohibiting reception of the push type distribution information such as identifiers of the first radio base stations or identifiers of areas defined to be formed by a plurality of the first radio base stations, and the reception control unit 426 judges whether or not to receive the push type distribution information by comparing this information stored in the reception control information memory unit 425 with the location information recognized by the location recognition unit 423 (step S52). Note that the information stored in the reception control information memory unit 425 may be identifiers of the second radio base stations or identifiers of areas defined to be formed by a plurality of the second radio base stations.

When the reception control unit 426 judges that the push type distribution information should be received, the second reception unit 422 receives the push type distribution information (step S53), or otherwise the second reception unit 422 does not receive the push type distribution information.

For example, in the case of judging this according to the radio base station identifier of the first radio base station, the reception control unit 426 checks whether the radio base station identifier of the first radio base station recognized by the location recognition unit 423 is stored in the reception control information memory unit 425 or not, and controls the second reception unit 422 to receive the push type distribution information when that radio base station identifier is not stored in the reception control information memory unit 425.

The above operation is carried out whenever the radio terminal 421 moves to another area, such that the push type distribution information is received according to the need.

On the other hand, the radio terminal 431 shown in FIG. 21 operates similarly as the radio terminal 421 of FIG. 20, but in addition it also includes an information reception prohibited area registration unit 427 such that the user can register the areas for prohibiting reception of the push type distribution information. In this case, as shown in FIG. 19, the user registers areas in which the prohibition of reception of the push type distribution information is desired (step S61), and the reception control information memory unit 425 of the radio terminal 431 stores the registered areas (step S62).

For example, the user who is carrying around the radio terminal 431 will carry out a prescribed operation such as pressing a specific button with respect to the radio terminal 431 when the user wishes to prohibit reception of the push type distribution information at that location. The location recognition unit 423 is recognizing the location according to the radio base station identifier or the like received through the first reception unit 424, so that when the user carries out such an operation, the reception control information memory unit 425 stores the location information recognized at that moment, such as the radio base station identifier, for example. The reception control information memory unit 425 may retain this information after it is stored once until the user carries out an operation for deleting the registration, or delete this information after a prescribed period of time has elapsed after the registration.

As an alternative registration method, the radio terminal 431 can be provided with a list of areas at which the push type distribution information is distributed, such that the user selects areas at which the prohibition of reception of the push type distribution information is desired from that area list, and registers the selected areas.

Similarly as described for the seventh embodiment, it is also possible to enable the operations of the radio terminal 421 or 431 from an external PC or the like.

By the above operation, in the case where the radio base station is provided at a railway station, for example, the prohibition of reception of the push type distribution information at the railway stations to be passed in commuting between the home and the place of employment that are normally not utilized by the user can be registered, such that it becomes possible to prevent the radio terminal from receiving the push type distribution information at those railway stations where reception of the push type distribution information is not desired. In particular, in the case of transmitting advertisement information for a vicinity of the railway station or information specific to the region as the push type distribution information at the radio base station of each railway station, it becomes possible to prevent the radio terminal of the user from receiving such information at railway stations other than those normally utilized by the user, according to the desire of the user.

As described, the radio terminal of the ninth embodiment will receive the push type distribution information transmitted by the radio base station only within prescribed areas. In particular, the push type distribution information will be received according to the desire of the user of the radio terminal. Also, it becomes possible for the user of the radio terminal to register areas in which the prohibition of reception of the push type distribution information is desired into the radio terminal easily. Consequently, it is possible to prevent the radio terminal from excessively frequently receiving the push type distribution information that is transmitted by the radio base station regardless of a request of the radio terminal, so that it is possible to prevent wasteful consumption of a battery power or a memory capacity of the radio terminal.

Also, in the case of providing the radio base station at a railway station, for example, the radio terminal owned by the user will receive the push type distribution information by selecting railways stations that are normally utilized by the user such as a nearby railway station of user's home, a nearby railway station of the user's place of employment and a nearby railway station of the user's school, or railway stations often utilized at a time of going out, while the radio terminal will not receive the push type distribution information at the other railway stations such as railway stations to be passed by the user in commuting between the home and the place of employment. Consequently, in the case of distributing the advertisement information or the like related to a vicinity of each railway station as the push type distribution information at each railway station, the advertisement information will be distributed only to those passengers who get on or off the trains at this railway station, so that the effective advertisement distribution becomes possible.

(Eleventh Embodiment)

Next, with references to FIG. 22 and FIG. 23, the eleventh embodiment of the present invention will be described.

Figure 22:
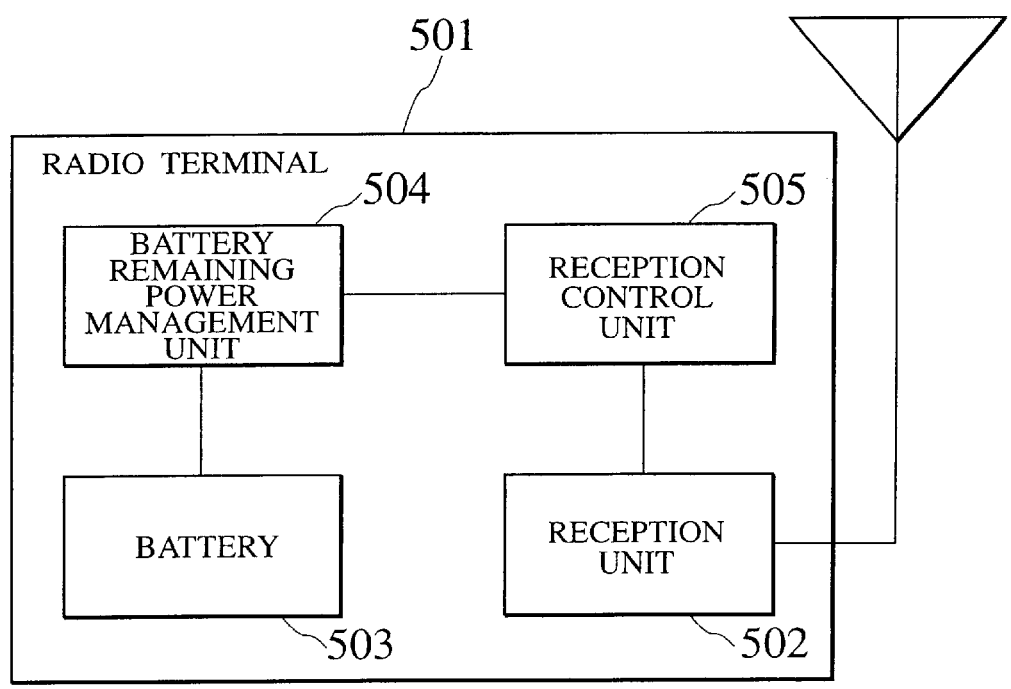
FIG. 22 is a block diagram showing an exemplary configuration of a radio terminal according to the eleventh embodiment of the present invention.
Figure 23:
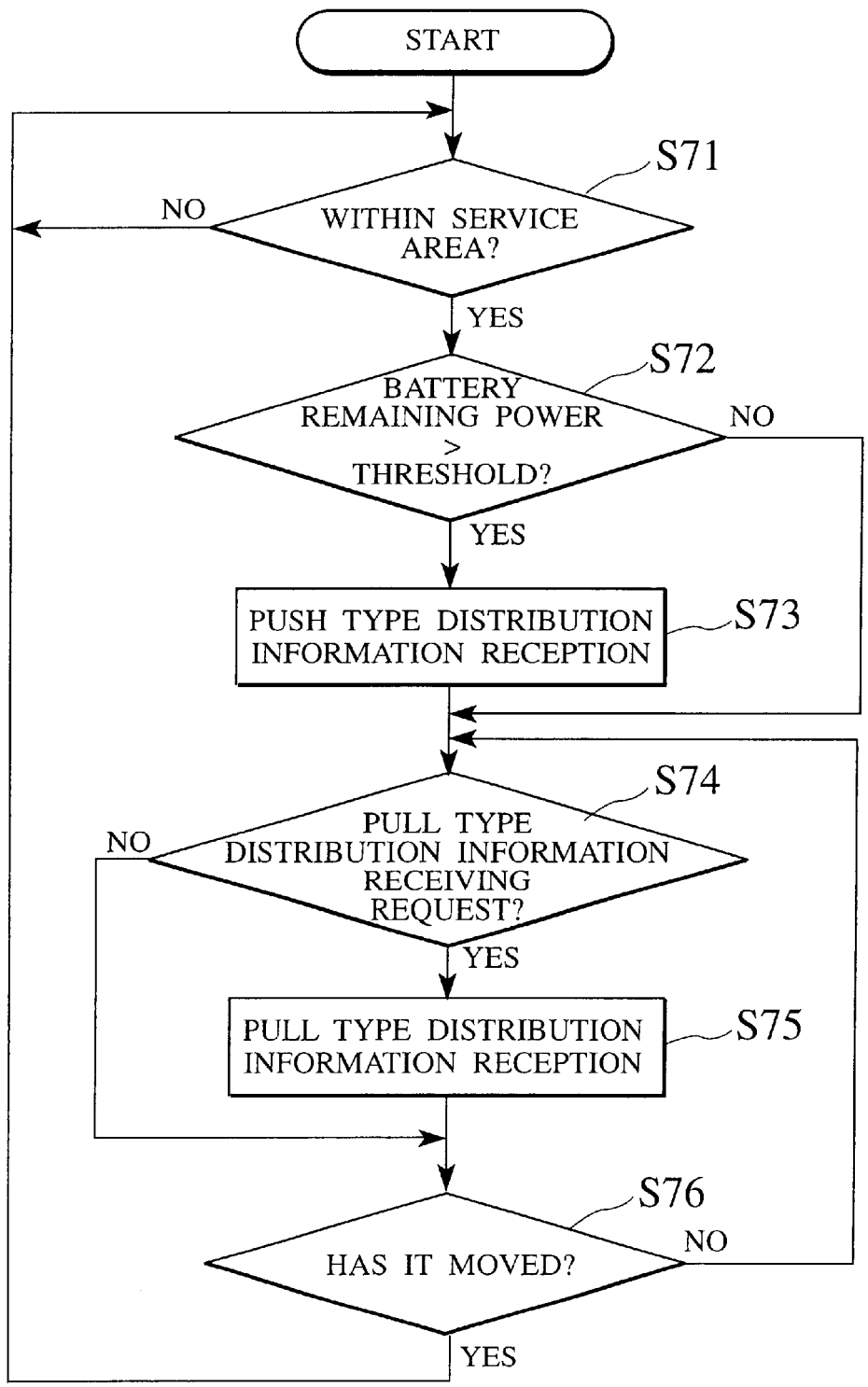
FIG. 23 is a flow chart showing an exemplary operation of a radio terminal according to the eleventh embodiment of the present invention.

FIG. 22 shows an exemplary configuration of the radio terminal according to the eleventh embodiment, which is a radio terminal that receives push type distribution information when a battery remaining power of the radio terminal is not less than a prescribed value. FIG. 23 shows an exemplary operation of the radio terminal of the eleventh embodiment.

As shown in FIG. 22, the radio terminal 501 includes at least a reception unit 502 for receiving control information transmitted from a radio base station by using radio and push type distribution information transmitted from that radio base station by using radio to this radio terminal 501 according to a request from a device other than this radio terminal 501 (that is, without a request from this radio terminal 501), a battery 503 for supplying power to the radio terminal 501 itself, a battery remaining power management unit 504 for managing a remaining power of the battery 503, and a reception control unit 505 for controlling the reception unit 502 by judging whether or not to receive the push type distribution information transmitted from the radio base station according to the battery remaining power managed by the battery remaining power management unit 504.

An exemplary operation of the radio terminal 501 of FIG. 22 will now be described along a flow chart shown in FIG. 23.

The reception unit 502 of the radio terminal 501 is receiving the control information broadcasted from the radio base station by using radio, and judges whether the radio terminal 501 itself is located within a service area or not according to whether the control information can be received or not (step S71).

The battery remaining power management unit 504 monitors the available remaining power of the battery 503, and notifies the battery remaining power to the reception control unit 505 at prescribed timings. Here, the battery remaining power management unit 504 may notify the fact that the battery remaining power became less than the prescribed value to the reception control unit 505 when this happens, or the reception control unit 505 may inquire the battery remaining power to the battery remaining power management unit 504 according to the need.

In this way, the reception control unit 505 can comprehend the information regarding the battery remaining power at least while the radio terminal 501 is located within the service area, and when the reception control unit 505 recognizes that the battery remaining power became less than the prescribed value (step S72 NO), the reception control unit 505 controls the reception unit 502 to prohibit reception of the push type distribution information transmitted by the radio base station.

On the other hand, when the reception control unit 505 recognizes that the battery remaining power is not less than the prescribed value (step S72 YES), the reception control unit 505 controls the reception unit 502 to carry out the reception of the push type distribution information (step S73).

After these operations, when there is a request to receive pull type distribution information according to a request of the radio terminal 501 (step S74), the reception control unit 505 controls the reception unit 502 to receive this pull type distribution information (step S75).

The above operation is carried out whenever the radio terminal 501 moves to another area, such that the radio terminal 501 receives the push type distribution information only when the battery remaining power is not less than the prescribed value.

It is also possible to modify this eleventh embodiment such that the control information is received by a radio communication system different from the radio base station that transmits the push type distribution information, similarly as in the second embodiment.

As described, the radio terminal of the eleventh embodiment will receive the push type distribution information transmitted by the radio base station only when the available battery remaining power is not less than the prescribed value. Consequently, it is possible to prevent the radio terminal from excessively frequently receiving the push type distribution information that is transmitted by the radio base station regardless of a request of the radio terminal, so that it is possible to prevent wasteful consumption of a battery power or a memory capacity of the radio terminal.

Also, in the case of providing the radio base stations at many railway station, for example, it is possible to prevent the radio terminal from causing a user's inconvenience by exhausting the battery power completely as a result of receiving the push type distribution information whenever the train approaches to each railway station while the user is on the train for the purpose of commuting between a nearby railway station of the user's home and a nearby railway station of the user's place of employment or school. It also becomes possible to leave some battery remaining power for the purpose of receiving the pull type distribution information that is to be received according to a request of the radio terminal. Consequently, in the case of distributing the advertisement information related to a vicinity of each railway station as the push type distribution information at each railway station, it is possible to prevent the radio terminal from becoming incapable of receiving the pull type distribution information as a result of receiving the push type distribution information excessively, so that it is possible to provide the radio terminal with the improved handling for the user.

(Twelfth Embodiment)

Next, with references to FIG. 24 and FIG. 25, the twelfth embodiment of the present invention will be described.

Figure 24:
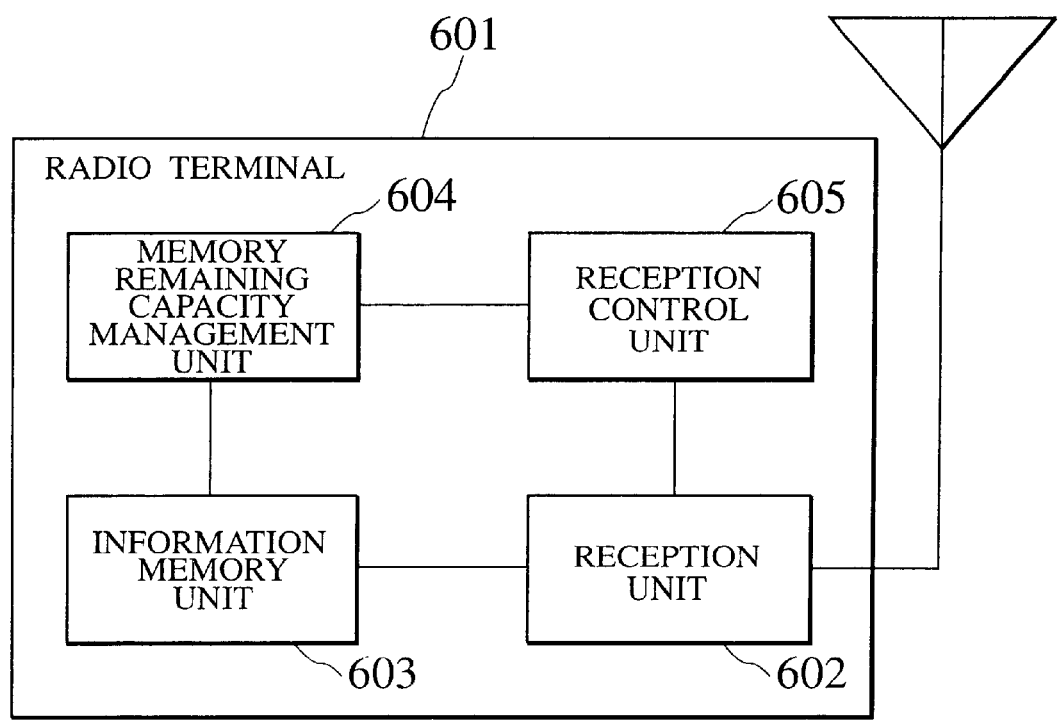
FIG. 24 is a block diagram showing an exemplary configuration of a radio terminal according to the twelfth embodiment of the present invention.
Figure 25:
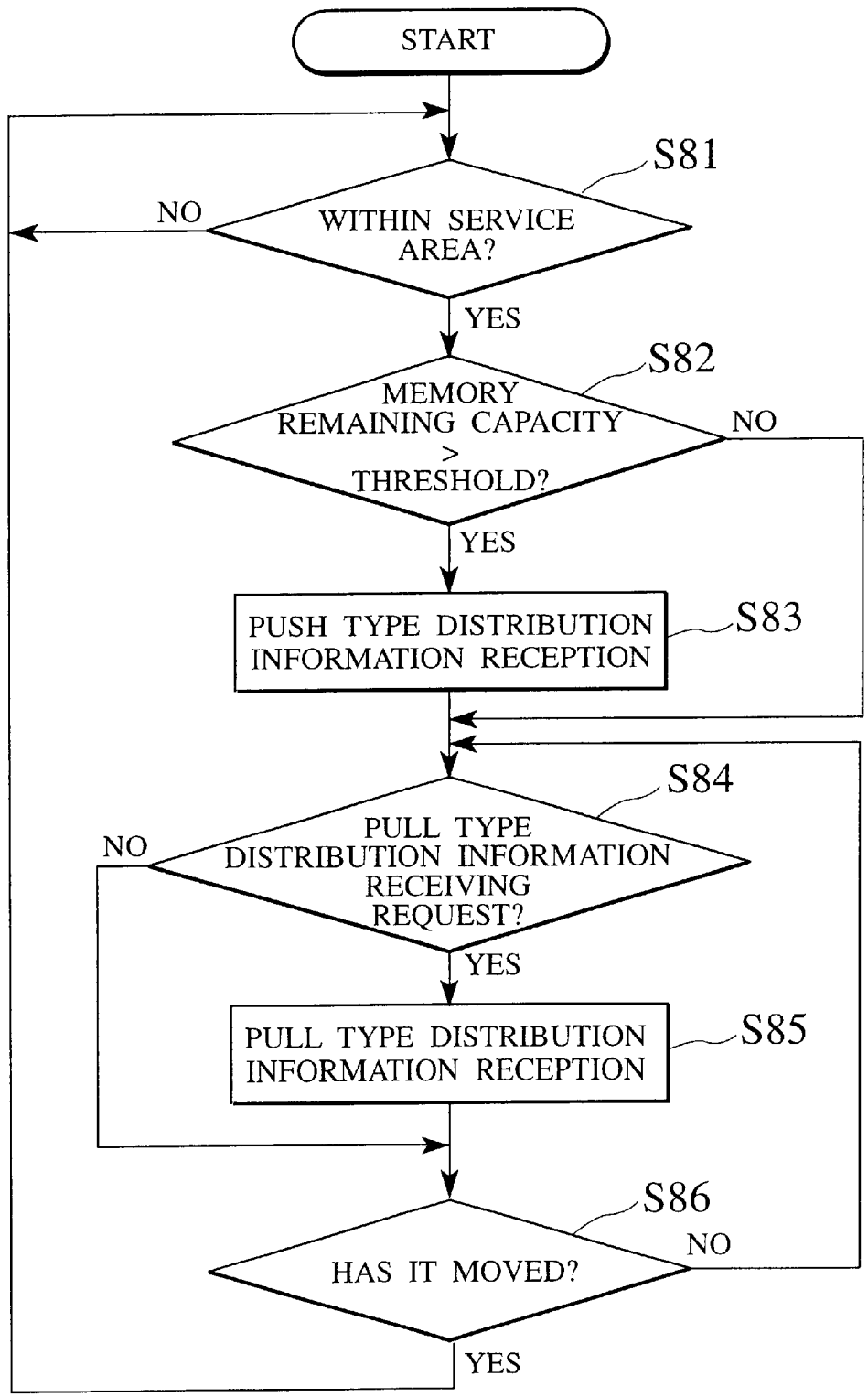
FIG. 25 is a flow chart showing an exemplary operation of a radio terminal according to the twelfth embodiment of the present invention.
Figure 26:
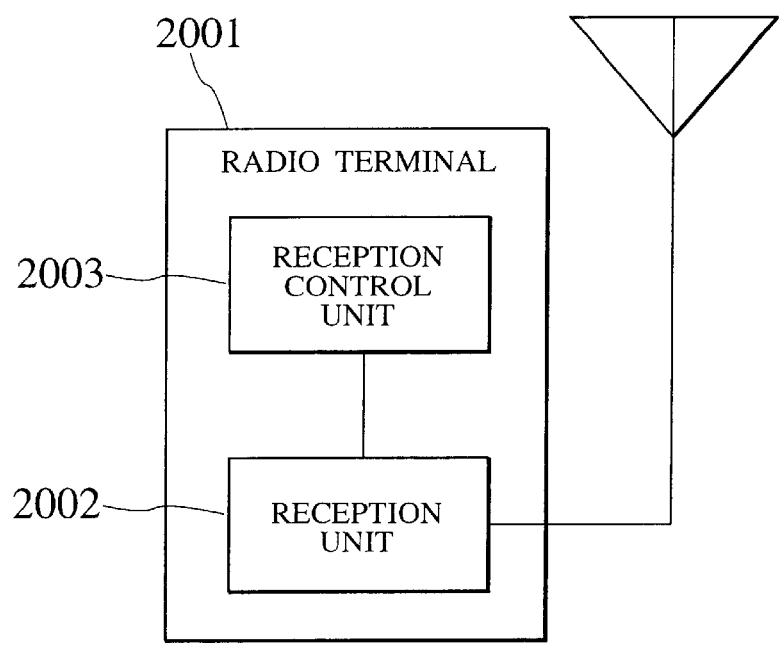
FIG. 26 is a block diagram showing an exemplary configuration of a conventional radio terminal.
Figure 27:
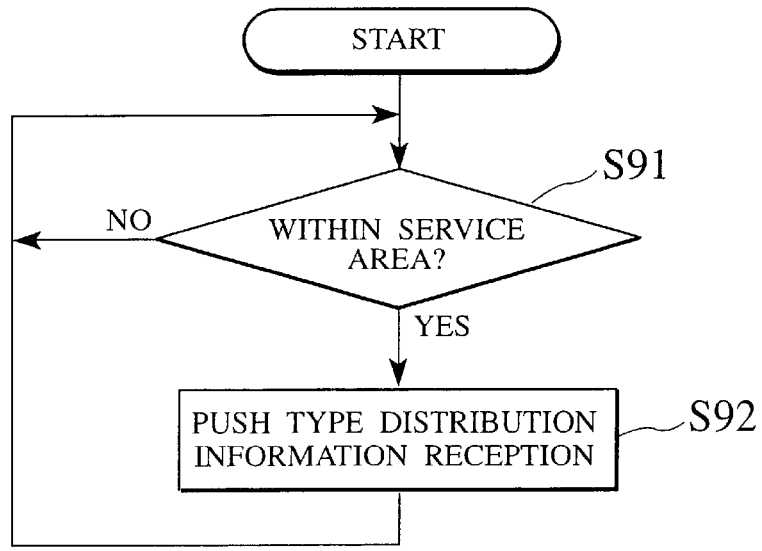
FIG. 27 is a flow chart showing an exemplary operation of a conventional radio terminal.

FIG. 24 shows an exemplary configuration of the radio terminal according to the twelfth embodiment, which is a radio terminal that receives push type distribution information when a memory remaining capacity of the radio terminal is not less than a prescribed value. FIG. 25 shows an exemplary operation of the radio terminal of the twelfth embodiment.

As shown in FIG. 24, the radio terminal 601 includes at least a reception unit 602 for receiving control information transmitted from a radio base station by using radio and push type distribution information transmitted from that radio base station by using radio to this radio terminal 601 according to a request from a device other than this radio terminal 601 (that is, without a request from this radio terminal 601), an information memory unit 603 for storing information received by the reception unit 602, a memory remaining capacity management unit 604 for managing a remaining capacity of the information memory unit 603, and a reception control unit 605 for controlling the reception unit 602 by judging whether or not to receive the push type distribution information transmitted from the radio base station according to the memory remaining capacity managed by the memory remaining capacity management unit 604.

An exemplary operation of the radio terminal 601 of FIG. 24 will now be described along a flow chart shown in FIG. 25.

The reception unit 602 of the radio terminal 601 is receiving the control information broadcasted from the radio base station by using radio, and judges whether the radio terminal 601 itself is located within a service area or not according to whether the control information can be received or not (step S81).

Also, the push type distribution information or the like that is received at the radio terminal 601 within the service area through the reception unit 602 can be stored into the information memory unit 603.

The memory remaining capacity management unit 604 monitors the available remaining capacity of the information memory unit 603, and notifies the memory remaining capacity to the reception control unit 605 at prescribed timings. Here, the memory remaining capacity management unit 604 may notify the fact that the memory remaining capacity became less than the prescribed value to the reception control unit 605 when this happens, or the reception control unit 605 may inquire the memory remaining capacity to the memory remaining capacity management unit 604 according to the need.

In this way, the reception control unit 605 can comprehend the information regarding the memory remaining capacity at least while the radio terminal 601 is located within the service area, and when the reception control unit 605 recognizes that the memory remaining capacity became less than the prescribed value (step S82 NO), the reception control unit 605 controls the reception unit 602 to prohibit reception of the push type distribution information transmitted by the radio base station.

On the other hand, when the reception control unit 605 recognizes that the memory remaining capacity is not less than the prescribed value (step S82 YES), the reception control unit 605 controls the reception unit 602 to carry out the reception of the push type distribution information (step S83).

After these operations, when there is a request to receive pull type distribution information according to a request of the radio terminal 601 (step S84), the reception control unit 605 controls the reception unit 602 to receive this pull type distribution information (step S85).

The above operation is carried out whenever the radio terminal 601 moves to another area, such that the radio terminal 601 receives the push type distribution information only when the memory remaining capacity is not less than the prescribed value.

It is also possible to modify this twelfth embodiment such that the control information is received by a radio communication system different from the radio base station that transmits the push type distribution information, similarly as in the second embodiment.

As described, the radio terminal of the twelfth embodiment will receive the push type distribution information transmitted by the radio base station only when the available memory remaining capacity is not less than the prescribed value. Consequently, it is possible to prevent the radio terminal from excessively frequently receiving the push type distribution information that is transmitted by the radio base station regardless of a request of the radio terminal, so that it is possible to prevent wasteful consumption of a battery power or a memory capacity of the radio terminal.

Also, in the case of providing the radio base station at a railway station and distributing the advertisement information related to a vicinity of each railway station as the push type distribution information at each railway station, for example, it is possible to prevent the radio terminal of a passenger of the train from exhausting the memory capacity completely as a result of receiving the push type distribution information at excessively many railway stations. Consequently, it becomes possible for the radio terminal to secure the memory capacity for the purpose of storing information other than the push type distribution information, and it is possible to prevent the radio terminal from becoming incapable of receiving the pull type distribution information that is to be received according a request of the radio terminal, so that it is possible to provide the radio terminal with the improved handling for the user.

In the following, some variations of the embodiments described above will be described.

First, it is possible to practice more than one of the push type distribution information reception control methods of the various embodiments described above in suitable combinations.

When more than one reception control methods are combined, there can be cases where it is determined to receive the push type distribution information according to one reception control method while it is determined not to receive the push type distribution information according to another reception control method. In order to deal with such cases, a determination by which reception control method should be given a higher priority may be determined in advance, or the push type distribution information may be received when any one of the reception control methods determines to receive the push type distribution information, or the push type distribution information may be received only when all the reception control methods determine to receive the push type distribution information, or the push type distribution information may be received when the majority of the reception control methods determine to receive the push type distribution information, or whether or not to receive the push type distribution information may be determined by a comprehensive evaluation.

For example, in the case of combining the method in which a staying for more than a prescribed period of time is used as a reception condition and the method in which being located within a registered area is used as a reception condition, it is possible to carry out the control to receive the push type distribution information at an area in which the radio terminal stays for more than a prescribed period of time as well as at a registered area, or the control to receive the push type distribution information only at a registered area in which the radio terminal stays for more than a prescribed period of time.

Also, for example, it is possible to determine whether or not to receive the push type distribution information by giving a top priority to the user's explicit indication for reception or prohibition of reception at those areas where such an indication is given by the user. It is also possible to enable the user to select a desired reception control method from a plurality of reception control methods provided at the radio terminal.

Next, it is also possible to practice more than one of the reception area or reception prohibited area setting/registration methods in suitable combinations. For example, the method in which information regarding the user is utilized as in the third embodiment and the method in which the reception areas are specified by the user can be used in combination.

Next, the embodiments described above are directed to the case where whether or not to receive the push type distribution information is determined at the radio terminal side and this determination is to be followed, but it is also possible to carry out another reception control independently from this determination. For example, the reception of information with a specific identification information attached thereto which is transmitted from the radio base station of some railway station may be made compulsory regardless of the result of determination on the radio terminal side. In this way, it is possible to make as many radio terminals as possible to receive the specific information that should be notified to as many people as possible. Also, in this case, it is possible to enable the user to make a setting as to whether any information with this specific identification information attached thereto will always be received, or information with this specific identification information attached thereto will also not be received when it is determined not to receive the push type distribution information at the radio terminal side.

Next, the embodiments described above are directed to the case where whether or not to receive the push type distribution information is determined at each area, but instead of that, it is also possible to determine the amount of data or the number of information for which the push type distribution information is to be received. For example, it is possible to set up a rank for receiving all the push type distribution information that is transmitted, a rank for receiving no push type distribution information, as well as ranks in i-steps for receiving up to Ni pieces of the push type distribution information that is transmitted, and determine a rank corresponding to a target area. To this end, the user may set up a rank for each area in advance, or a rank may be appropriately set up according to the information regarding the user (by setting a higher rank to an area of a railway station which is more likely relevant to the user), or a rank may be appropriately set up according to the staying time in the same area (by setting a higher rank to an area for which the staying time is longer). Besides these, it is also possible to use many other methods.

Next, the above embodiments have been described mostly for an exemplary case where a radio base station that has a service area covering an area of a railway station is provided at each railway station and the advertisement information or the regional information related to a vicinity of each railway station is distributed as the push type distribution information at each railway station, but the present invention is obviously also applicable to various situations other than that involving the railway. For example, the present invention is also applicable to the case where a radio base station that has a service area covering a vicinity of a crossing is provided and the user who has the radio terminal will move by driving a car. The present invention is also applicable to the case where radio base stations are provided at various spots in a town (such as stores, for example) and the user who has the radio terminal will walk through the town for shopping.

Thus according to the present invention, the radio terminal receives and stores the push type distribution information only at locations requested by the user of the radio terminal or locations that the user of the radio terminal may potentially utilize, so that it is possible to realize the radio terminal with the improved handling for the user, while also realizing the effective distribution of the advertisement information or the like. Moreover, it is also possible to prevent the wasteful consumption of the battery power or the memory capacity available in the radio terminal.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the radio terminal of each of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A radio terminal of comprising:

a reception unit configured to receive push type distribution information from a radio base station which is transmitting the push type distribution information related to an area to which the radio base station belongs, without requiring a request from the radio terminal;

a location recognition unit configured to carry out a recognition related to an area in which the radio terminal is located; and a reception control unit configured to determine whether or not to receive the push type distribution information according to a recognition result of the location recognition unit, and control the reception unit according to a determination result, wherein the reception control unit determines to receive the push type distribution information when it is judged that the radio terminal is staying in an identical area for more than a prescribed period of time according to the recognition result.

* * * * *